(12) United States Patent
Sugawara et al.

(10) Patent No.: US 7,641,373 B2
(45) Date of Patent: Jan. 5, 2010

(54) BACKLIGHT UNIT

(75) Inventors: Hideaki Sugawara, Kanagawa (JP);
Hiroshi Ishida, Kanagawa (JP)

(73) Assignee: NEC LCD Technologies, Ltd.,
Kawasaki, Kanagawa (JP)

( * ) Notice: Subject to any disclaimer, the term of this patent is extended or adjusted under 35 U.S.C. 154(b) by 274 days.

(21) Appl. No.: 11/516,488

(22) Filed: Sep. 7, 2006

(65) Prior Publication Data

US 2007/0058390 A1    Mar. 15, 2007

(30) Foreign Application Priority Data

Sep. 15, 2005    (JP)    ............... 2005-267866

(51) Int. Cl.
*F21V 7/04*    (2006.01)
(52) U.S. Cl. ............... 362/560; 362/70; 362/90; 362/217; 362/225; 362/600
(58) Field of Classification Search ............... 362/560, 362/70, 90, 217, 222, 225, 235, 237, 242–245, 362/247, 296–298, 26, 27, 600, 609, 614, 362/623, 624, 260, 346
See application file for complete search history.

(56) References Cited

U.S. PATENT DOCUMENTS

| | | | | |
|---|---|---|---|---|
| 5,038,259 A | * | 8/1991 | Katoh et al. | ............... 362/256 |
| 5,632,547 A | * | 5/1997 | Ge et al. | ............... 362/16 |
| 6,364,505 B1 | * | 4/2002 | Shoenfeld | ............... 362/241 |
| 7,223,003 B2 | * | 5/2007 | Kim | ............... 362/561 |
| 7,455,425 B2 | * | 11/2008 | Inoue et al. | ............... 362/241 |
| 2004/0257793 A1 | | 12/2004 | Wakabayashi | |

FOREIGN PATENT DOCUMENTS

| | | |
|---|---|---|
| CN | 1573463 A | 2/2005 |
| JP | 63-8777 | 1/1988 |
| JP | 11-84377 | 3/1999 |

\* cited by examiner

*Primary Examiner*—Sandra L O'Shea
*Assistant Examiner*—Mark Tsidulko
(74) *Attorney, Agent, or Firm*—McGinn IP Law Group, PLLC

(57) ABSTRACT

Disclosed is a backlight unit which illuminates a display panel from a rear surface thereof, including at least: tubular lamps arranged in parallel to the panel; and a reflecting member which reflects light from the lamps toward the panel, wherein the reflecting member is divided into a first region opposed to an area near an electrode provided in an end portion of the lamp and a second region nearer to a middle area than the first region, the first region having a higher reflectance than the second region. In another backlight unit, a reflecting member is divided, with respect to the arrangement direction of the lamps, into an end lamp near region which is opposed to a lamp arranged in end portion and a middle region which is nearer to a middle area than the end lamp region, the end lamp region having a higher reflectance than the middle region.

22 Claims, 23 Drawing Sheets

BACKLIGHT UNIT

BACKGROUND OF THE INVENTION

1. Field of the Invention

The present invention relates to a backlight unit and, more particularly, to a direct type backlight unit suitable for use in a thin-model display device of a liquid crystal and the like.

2. Description of the Related Art

Liquid crystal display devices are widely used as monitors of office automation equipment and television sets and the like in terms of their characteristics, such as small size, thin design and low power consumption. The liquid crystal display device is constituted by a liquid crystal panel, in which a liquid crystal is supported by being sandwiched between opposed transparent substrates, a backlight unit which generates backlight illuminating the liquid crystal panel, and the like. As the kinds of backlight units, there have been known the direct type, the edge light type, the surface light source type and the like. The direct type is such that a light source is arranged on a rear surface of a liquid crystal panel and the light emitted from the light source is reflected on a reflector. The edge light type is called also the side light type. In this type, a light source is arranged on a side surface of a liquid crystal panel and the light emitted from the light source is guided on the whole rear surface of the liquid crystal panel by use of a light guide plate. The surface light type is such that a surface light source is arranged on a rear surface of a liquid crystal panel and the whole rear surface is illuminated. Usually, the direct type is used in large-sized liquid display devices.

For example, as shown in FIG. 1, a conventional direct type backlight unit 100 is constituted by a plurality of a lamp 5, a lamp support 6, a lamp connector 7, a reflector 8, a diffuser 4, an optical sheet 3, a center frame 2 and a rear frame 10. In FIG. 1, a liquid crystal panel (not shown) is assembled on the upper side of the backlight unit 100, whereby a liquid display device is constituted.

The lamp 5 is constituted by a plurality of cold cathode fluorescent lamps and the like. A pair of, lamp supports 6 supports end portions of the lamp 5. The lamp connector 7 is a connector for connecting the lamp 5 to an external circuit such as an inverter lighting circuit. The reflector 8 causes the light emitted from the lamp 5 to be reflected in the direction of the liquid crystal panel surface. The diffuser 4 is provided in order to diffuse the direct light from the lamp 5 and the reflected light from the reflector 8, whereby uniform light is made. The optical sheet 3 is constituted by a lens sheet, a polarizing sheet and the like. The center frame 2 and the rear frame 10 constitute a casing or a cabinet which holds the above-described components.

FIG. 2A is a plan view which shows the positional relationship of main members, including the lamp 5 and the reflector 8, in the conventional structure of FIG. 1. FIG. 2B is a sectional view which schematically shows the section along the line IIB-IIB in FIG. 2A as viewed from the direction of the arrow. As shown in these figures, the reflector 8 formed from a material having uniform reflectance is arranged on an inner bottom surface and inner inclined surfaces of the rear frame 10, whereby a lamp house is constructed. In the inner space in the interior of this lamp house, there are arranged plural linear lamps 5 at substantially fixed intervals substantially in parallel to each other.

The cold cathode fluorescent lamp used in this lamp 5 converts ultraviolet rays generated by discharges across electrodes provided at both ends into visible rays by use of a fluorescent substance applied to an inner wall of a glass tube. In this cold cathode fluorescent lamp, in general, the discharge condition across the electrodes is not uniform in the longitudinal direction, and regions of weak discharge are present near the electrodes. For this reason, usually, the luminance is low in an electrode near region A (FIG. 2A), which is in the vicinity of the electrodes of the lamp 5, and the luminance is high in a middle region B (FIG. 2A) in the longitudinal direction, which is positioned in the middle in the longitudinal direction of the lamp 5. As a result, even when the diffuser 4 is arranged, it is impossible to uniformly illuminate the liquid crystal panel, there by posing the problem that display quality decreases.

To solve this problem of a decrease in luminance in the electrode near region A, there has been proposed, for example, a backlight unit disclosed in Japanese Patent Laid-Open publication No. 1999-84377A. In this backlight unit, in a frame provided with a roughly rectangular bottom surface and side walls surrounding the bottom surface, which together form a lamp house, all of the side walls are provided with an inclination. That is, the inner surfaces of two side walls parallel to a linear light source (a lamp) are inclined surfaces in a direction in which the inclined surfaces open from the bottom of the frame toward the liquid crystal panel, and the inner surfaces of two side walls perpendicular to the linear light source are inclined surfaces in a direction in which the inclined surfaces close, inversely, from the bottom of the frame toward the liquid crystal panel.

In a backlight unit disclosed in Japanese Utility Model Laid-Open publication No. 1988-8777A, a reflecting section is provided with an uneven reflecting surface. That is, in the longitudinal direction of a light-emitting section (a lamp), both end portions where light-emitting luminance decreases have a concave shape and the middle portion where light-emitting luminance increases has a convex shape. On the other hand, in the side-surface direction (lateral direction) of the light-emitting section, the backlight unit has a roughly concaved shape which includes the circumference of, at least, the lower part of this light-emitting section and has an inclined surface which directs reflected rays toward the display panel.

By using these conventional constructions, it is possible to suppress a decrease in luminance in the region near the electrode of the lamp. In the former construction, however, the two inner surfaces of side walls perpendicular to the lamp provide inclined surfaces in the direction in which the inclined surfaces close from the bottom of the frame toward the liquid crystal panel and, therefore, in the longitudinal direction of the lamp the backlight unit protrudes outward from the liquid crystal panel. As a result, this poses the problem that the size of a frame outside the display area of the liquid crystal panel increases.

In the latter construction, because the reflecting section is worked in wave form, the construction becomes complicated and the manufacturing cost increases. Furthermore, the uneven construction of the reflecting section poses the problem that the thickness of the backlight unit increases inevitably.

In addition to the problem of a decrease in luminance in the longitudinal direction of the lamp 5, there is another problem that luminance decreases in the arrangement direction of the lamp 5 arranged in multiple numbers. That is, in a middle region D (FIG. 2A) in the lamp arrangement direction, which is positioned in the middle of the arrangement direction of multiple lamps 5, luminance is high because illumination is performed by at least two adjacent lamps 5. In contrast to this, in a region C (FIG. 2A) near the end lamp, which is in the vicinity of the lamp 5 arranged in the end portion of the arrangement direction, illumination is performed by only one lamp 5 in the end portion and, therefore, luminance is low compared to the middle region D. For this reason, usually, such a decrease in luminance is suppressed by increasing the reflectance of the side wall (an inclined surface) of the frame outside the end lamp. However, in a case where the spacing between the end lamp and the inclined surface is large, a decrease in luminance cannot be sufficiently suppressed by the reflection from the inclined surface alone.

SUMMARY OF THE INVENTION

The present invention has been made in view of problems as described above. The object of the present invention is to provide a backlight unit which can improve the uniformity of luminance by a simple construction while realizing a narrow display frame, thin design and low manufacturing cost.

The present invention provides a backlight unit which illuminates a display panel from a rear surface thereof, including at least: tubular lamps arranged in parallel to the display panel; and a reflecting member which reflects light from the lamps toward the display panel, wherein the reflecting member is divided into a first region opposed to an area near an electrode provided in an end portion of the lamp and a second region nearer to a middle area than the first region, the first region having a higher reflectance than the second region.

Further, the present invention provides another backlight unit which illuminates a display panel from a rear surface thereof, including at least: tubular lamps arranged in parallel to the display panel; and a reflecting member which reflects light from the lamps toward the display panel, wherein the reflecting member is divided, with respect to the arrangement direction of the lamps, into at least an end lamp near region which is opposed to an area near a lamp arranged in an end portion and a middle region which is nearer to a middle area than the end lamp near region, the end lamp near region having a higher reflectance than the middle region.

According to a backlight unit based on the present invention, it is possible to improve the uniformity of luminance within a surface illuminated by the backlight while realizing a narrow display frame, thin design and low manufacturing cost due to narrower frame breadth. This is because a reflecting member does not have an even reflectance, because the reflecting member is divided into at least end regions near the electrode or near the end lamp and a middle region on the middle side nearer to the middle than the end regions, and because the reflectance in the end regions is made higher than that of the middle region. As a result of this, a decrease in luminance which occurs due to the characteristics of the lamp and the arrangement of the lamp can be positively suppressed without an increase in the size of the frame breadth, an increase in thickness and a rise in price.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

Exemplary embodiments of the present invention will now be described in detail in accordance with the accompanying drawings.

The gist of the present invention is as follows. That is, the present invention is characterized in that in a backlight unit of a direct type used in a thin display device (e.g., a liquid crystal display), a reflecting member which reflects the light emitted from plural tubular lamps arranged substantially parallel to each other toward the display panel. This reflecting member is divided into end side regions each opposed to an area near an electrode or an area near an end lamp (the first region) and a middle side region nearer to the middle than the first region (the second region) and the reflectance (reflectivity) of the first region is made higher than that of the second region. As a result of this, it is possible to increase the luminance in the region near the electrode where the luminance decreases due to the characteristics of the lamp and/or to increase the luminance in the region near the end lamp where the luminance decreases due to the arrangement of the lamp. As a result, it is possible to improve the uniformity of luminance within illumination by the backlight unit.

First Exemplary Embodiment

Figure 3:
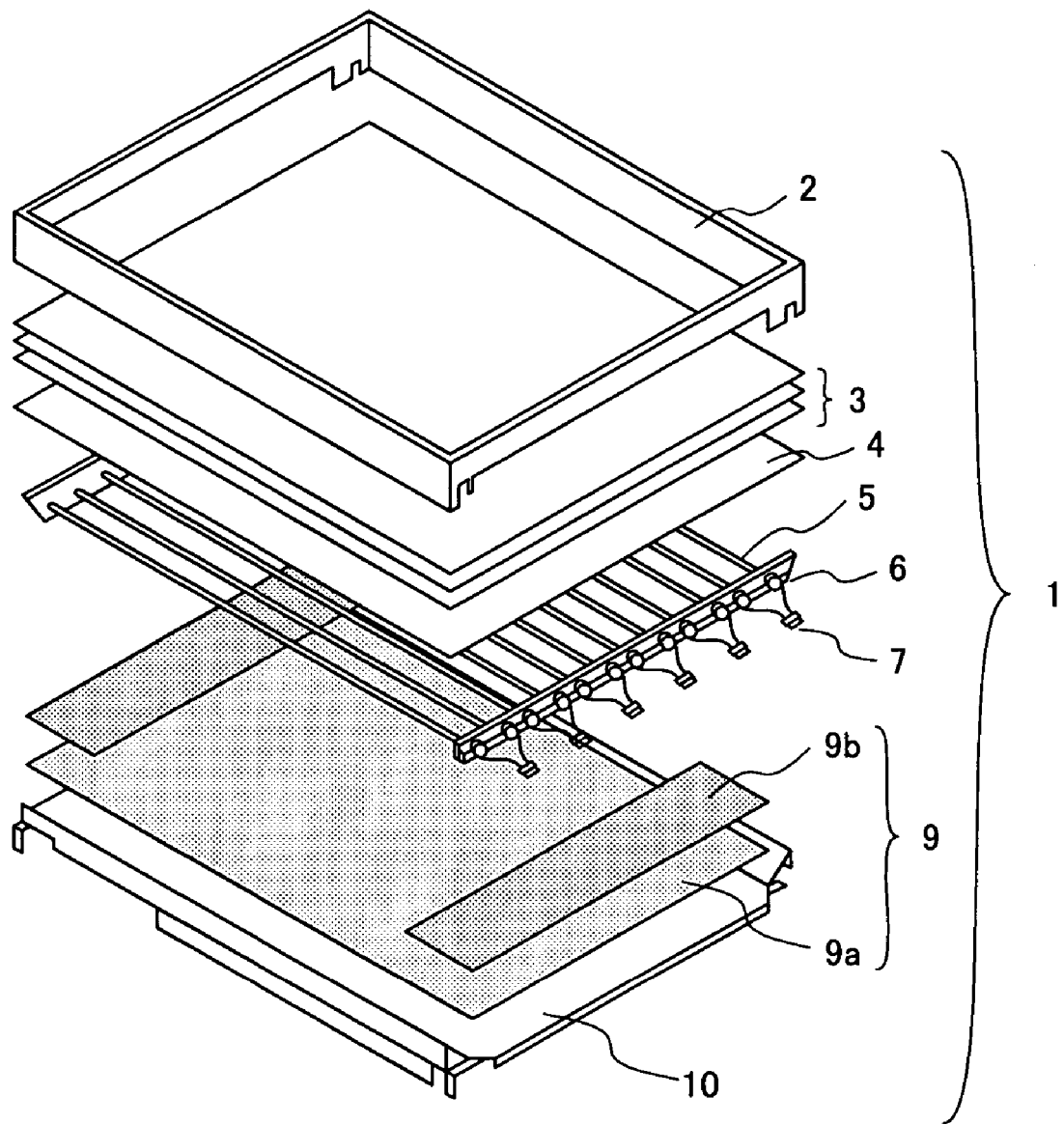
FIG. 3 is a perspective view which shows the construction of a backlight unit according to a first exemplary embodiment of the present invention in an exploded condition.
Figures 4A, 4B:
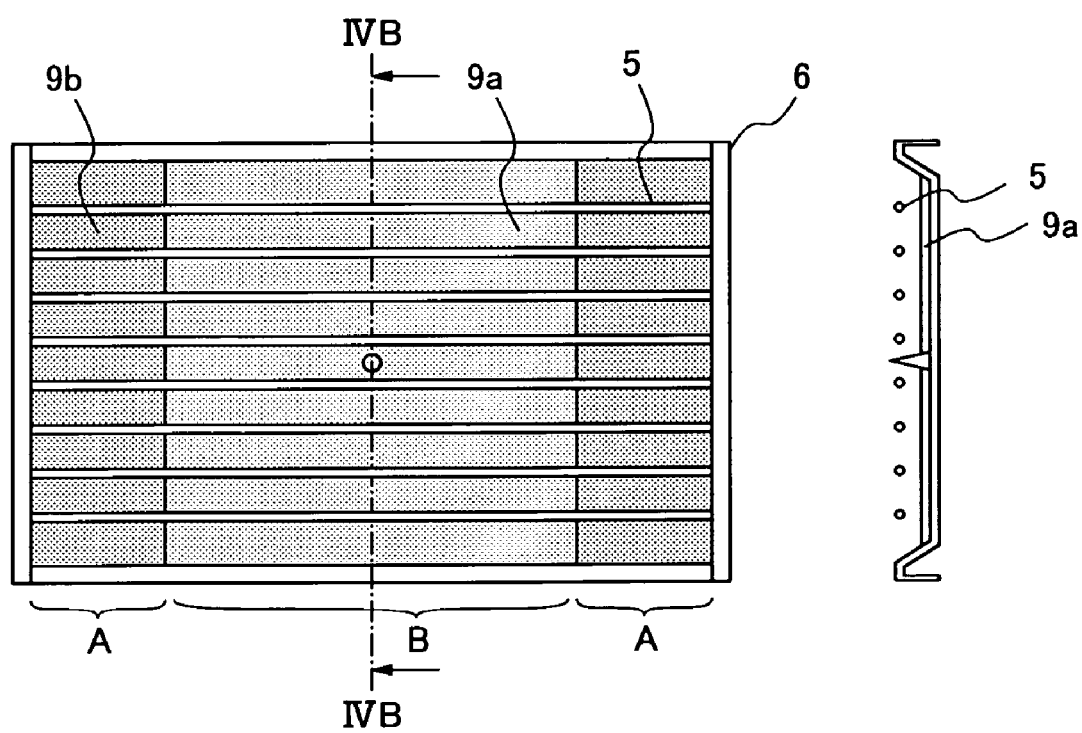
FIG. 4A is a plan view which shows the positional relationship of main members of the backlight unit according to the first exemplary embodiment of the present invention.
FIG. 4B is a sectional view which schematically shows the section along the line IVB-IVB in FIG. 4A as viewed from the direction of the arrow.
Figure 5:
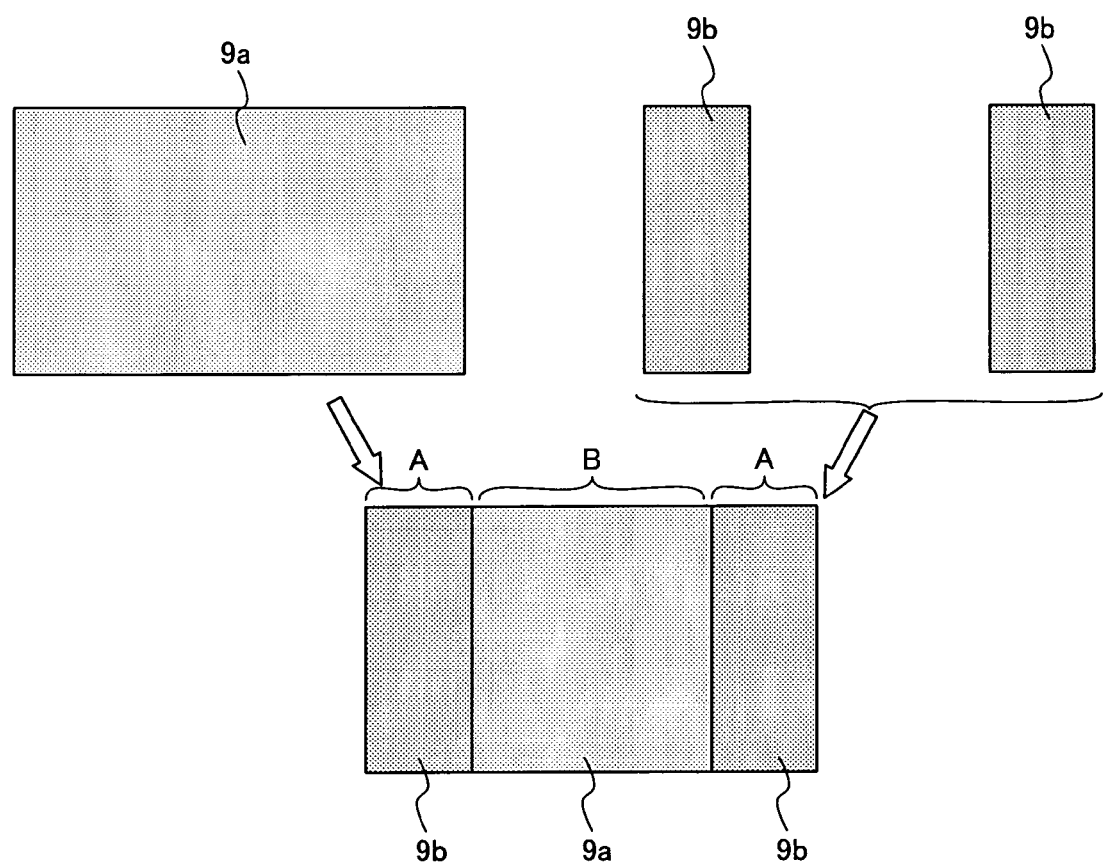
FIG. 5 is a plan view which shows the construction of a reflecting member according to the first exemplary embodiment of the present invention.

First, the first exemplary embodiment of the present invention will be described. FIG. 3 is a perspective view which shows the construction of a backlight unit according to the first exemplary embodiment of the present invention in an exploded condition. FIG. 4A is a plan view which shows the positional relationship of main members of the backlight unit according to the first exemplary embodiment of the present invention. FIG. 4B is a sectional view which schematically shows the section along the line IVB-IVB in FIG. 4A as viewed from the direction of the arrow. FIG. 5 is a plan view which shows the construction of a reflecting member according to the first exemplary embodiment of the present invention.

As shown in FIG. 3, a backlight unit 1 in this exemplary embodiment is constituted by a lamp 5, a lamp support 6, a lamp connector 7, a reflecting member 9, a diffuser 4, an optical sheet 3, a rear frame 10 and a center frame 2.

The lamp 5 is a plurality of tubular lamps such as cold cathode fluorescent lamps. A pair of lamp supports 6 supports end portions (e.g., electrodes) of the plural lamps 5. The lamp connector 7 is a connector for connecting each of the lamps 5 to an external circuit such as an inverter lighting circuit. The reflecting member 9 as optical reflecting means causes the light emitted from the lamp 5 to be reflected in the direction of the display panel (not shown) and is provided with a first reflector 9a and a second reflector 9b. The diffuser 4 diffuses the direct light from the lamp 5 and the reflected light from the reflecting member 9, whereby the uniformity of overall luminance is improved. The optical sheet 3 is constituted by a lens sheet for focusing the diffused light on each pixel of a liquid crystal panel, a polarizing sheet which polarizes the focused light and the like. The rear frame 10 holds the reflecting member 9, the lamp 5 and structural members or components near the lamp. The center frame 2 is a frame for mounting the display panel (not shown) by holding the diffuser 4 and the optical sheet 3. The center frame 2 is firmly fixed to the rear frame 10 by screwing or other publicly known fixing mechanisms.

It is necessary only that the first reflector 9a and second reflector 9b which constitute the reflecting member 9 have the function of irregularly (diffusely) reflecting the light from the lamp 5, and the material, thickness, manufacturing method and the like of the first reflector 9a and the second reflector 9b are not especially limited. These reflectors can be formed, for example, from a thin sheet material which is obtained by applying a white paint or pigment to a plastic base material of PET (polyethylene terephthalate) and the like. Or alternatively, they can also be formed from a plate material which is obtained by causing a white paint or pigment to be contained in a plastic base material, such as foamed PET or polycarbonate, and injection molding the plastic base material. The fixing method for the first reflector 9a and the second reflector 9b is not especially limited, either. For example, the first reflector 9a is fixed to the rear frame 10 by using an adhesive material, such as double-faced adhesive tape, and a bond. It is possible to adopt a construction which is such that the second reflector 9b is fixed to the first reflector 9a similarly by using an adhesive material, a bond and the like. Incidentally, in the example of construction of a backlight unit shown in FIG. 3, the construction, shape, arrangement and the like of members other than the reflecting member 9 can be appropriately changed.

As shown in FIG. 4A and FIG. 4B, the reflecting member 9 is firmly fixed to the rear frame 10, whereby a lamp house is formed, and the lamps 5 are arranged in the space in the interior of this lamp house. These lamps 5 are arranged parallel to a reflecting surface (an illuminated surface) of the reflecting member 9 at substantially fixed intervals and substantially parallel to each other. As a result, the lamps 5 are also parallel to a display panel of a liquid crystal and the like (not shown) which is mounted above the backlight unit. Incidentally, the sectional shape of these lamps 5 is cylindrical, elliptical, flat-plate-like, and the like. The reflecting surface of the reflecting member 9 is divided into a region A which is opposed to an area near electrodes of the lamp 5 (an electrode near region A) and a region B nearer to a middle area than the region A in the longitudinal direction (a longitudinal middle region B). Incidentally, the electrode near region A and the longitudinal middle region B in FIG. 4A are exemplary ones. It is necessary only that the region A be constructed so as to contain a region where luminance decreases, and the shape of each region and the boundary position of each region can be appropriately changed according to the characteristics of the lamp 5 and the like.

As described in connection with the related art, the lamp 5 is caused to emit light by discharges across electrodes provided in both end portions of the lamp 5, and as the general properties of this lamp, the luminance is relatively small in the region A near the electrode and relatively large in the middle region B in the longitudinal direction. For this reason, the distribution of luminance occurs in the longitudinal direction of the lamp 5 and it is impossible to uniformly illuminate the display panel. To solve this problem, there have been proposed a conventional structure in which the inclined surfaces provided in an end portion of the lamp 5 are bended in the direction in which the inclined surface is closed and a conventional construction in which uneven surface is provided on a reflector, whereby the light in the middle region is distributed to the region near the electrode. However, these conventional constructions have the problems of an increase in the size of the frame width, an increase in thickness a rise in cost and the like.

In this exemplary embodiment, therefore, the reflecting member 9 is adopted in order to suppress a decrease in luminance in the region near the electrode, which is a general characteristics of the lamp, while realizing a narrow display frame, thin design and lower cost of the backlight unit. In this reflecting member 9, by using the constructions and methods shown in FIG. 5 to FIG. 9, the reflectance in the electrode near region A of the reflecting member 9 is made higher than the reflectance of the middle region B in the longitudinal direction. Hereinafter, each of the constructions and methods will be described in sequence. Incidentally, in FIG. 5 to FIG. 9, only the construction of the reflecting member 9 corresponding to the inner bottom surface of the rear frame 10 is shown. In a case where side walls of the rear frame 10 are formed as inclined surfaces and the reflecting member 9 is arranged also on these inclined surfaces, the size of the first reflector 9a and of the second reflector 9b may be increased as required.

In the present invention, a plane or a surface illuminated by the reflection of the reflecting member 9 is called a backlight reflection surface. This is shown in FIG. 4A, for example. Accordingly, in a case where the side walls of the rear frame 10 does not have an inclined surface and the reflecting member 9 covers only the inner bottom surface of the rear frame 10, the backlight reflection surface (=the area of the reflecting member 9) becomes equal to the inner bottom surface of the rear frame 10. On the other hand, in a case where the side walls of the rear frame 10 have inclined surfaces, the backlight reflection surface becomes a total of the inner bottom surface of the rear frame and the inclined surfaces of the side walls.

An example of the construction of the reflecting member 9 which will be described first is the construction shown in FIG. 3 to FIG. 5. That is, a region having a high reflectance is formed in the electrode near region A by superposing two kinds of reflectors (reflecting materials). Concretely, as shown in FIG. 5, the whole area of the backlight reflection surface (both the electrode near region A and the longitudinal middle region B) is formed as the first reflector 9a, and the second reflector 9b is arranged in the region A on the top surface (the lamp 5 side) of this first reflector 9a. In the case of this construction, the reflectance of the reflecting member 9 will be described below by designating the reflectance of the first reflector 9a and the second reflector 9b as $\alpha$ and the reflectance of the rear frame 10 as $\alpha F$ and on the assumption that the absorption of light does not occur in the first reflector 9a or in the second reflector 9b.

In the longitudinal middle region B, the light which has been transmitted through the first reflector 9a is reflected by the rear frame 10 arranged on the rear side of the first reflector 9a and returns to the first reflector 9a and, therefore, the reflectance of the region B becomes approximately $\alpha+(1-\alpha)\times\alpha F$. On the other hand, in the electrode near region A, the light which has been transmitted through the second reflector 9b is reflected by the first reflector 9a arranged on the rear side of the second reflector 9b and returns to the second reflector 9b and, therefore, the reflectance of the region A becomes approximately $\alpha+(1\alpha)\times\alpha$ if the optical element which is transmitted through the first reflector 9a is ignored. Therefore, the difference between the reflectance of the region A and the reflectance of the region B becomes $(1-\alpha)\times(\alpha-\alpha F)$. As a result, it is possible to make the reflectance of the region A higher than the region B by forming the first reflector 9a and the second reflector 9b so as to ensure $\alpha>\alpha F$. In the case of the above-described construction, the reflectance of the first reflector 9a and the reflectance of the second reflector 9b may be the same or different from each other. The reflectance can be changed by changing the amount of a white paint or a white pigment which is applied to PET or contained in polycarbonate. Incidentally, contrary to FIG. 5, the second reflector 9b may be firmly fixed to the rear surface (the rear frame 10 side) of the first reflector 9a.

Figure 6:
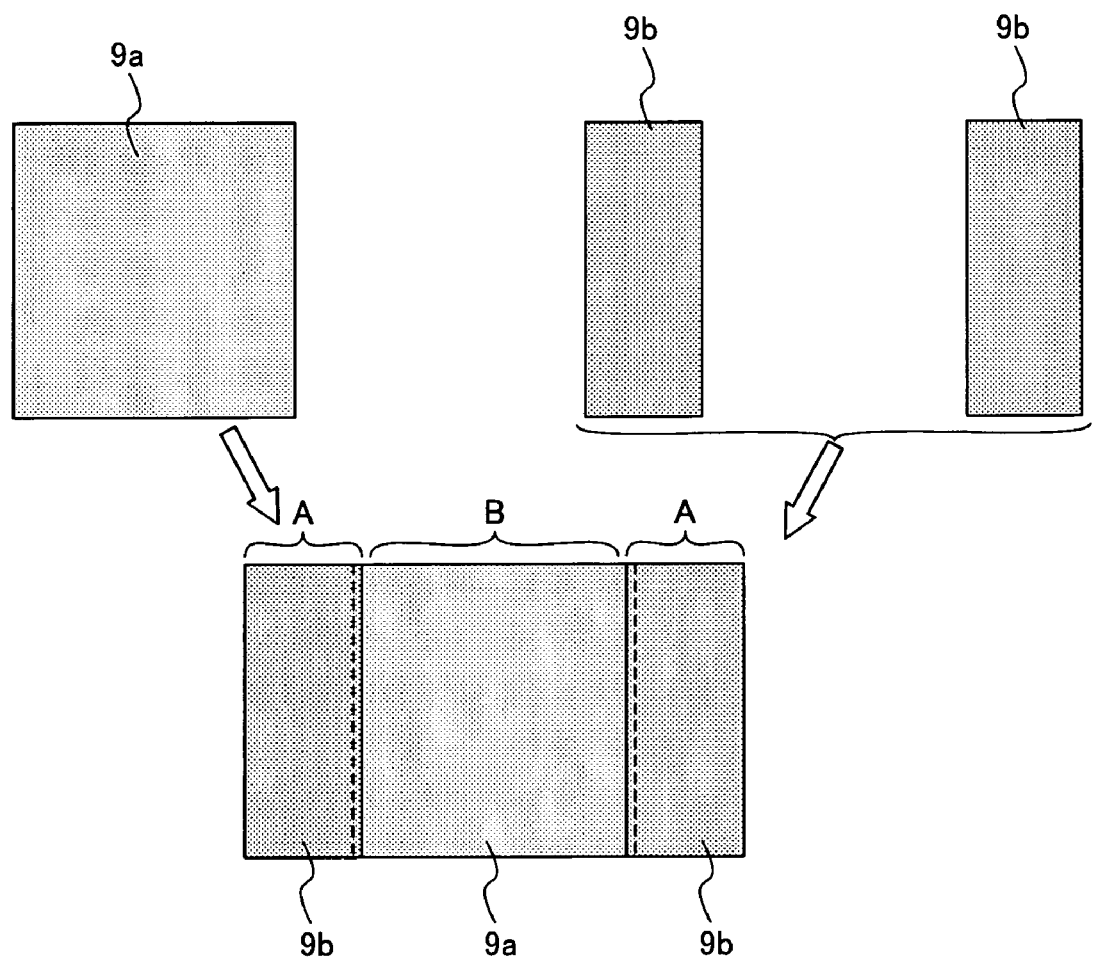
FIG. 6 is a plan view which shows the first modification of the reflecting member according to the first exemplary embodiment of the present invention.

Next, modifications of the construction of the reflecting member 9 will be described. FIG. 6 is a plan view which shows the first modification of the reflecting member 9 according to the first exemplary embodiment of the present invention. In this example of construction, the reflectance of the two regions is varied by arranging two reflectors (i.e., two reflecting materials) having different reflectances. Concretely, as shown in FIG. 6, the first reflector 9a having a relatively low reflectance is disposed in the longitudinal middle region B of the backlight reflection surface and the second reflector 9b having a relatively high reflectance is disposed in the electrode near region A. Even with this construction, the reflectance of the region A can be made higher than the reflectance of the region B. The first reflector 9a and the second reflector 9b are made, as described above, from a plastic base material, such as PET and polycarbonate, and contract or expand under the influence of heat. For this reason, when the reflectors themselves contract thermally, a gap is generated between the first reflector 9a and the second reflector 9b and the rear frame 10 is exposed, with the result that the luminance decreases remarkably in this portion and that there is a possibility that this may affect picture quality. When the reflectors themselves expand thermally, the first reflector 9a and the second reflector 9b that have been divided collide against each other, there is a possibility that the reflectors are deformed and that the reflecting characteristics change at the boundary between the reflectors. Therefore, it is preferred that the first reflector 9a and the second reflector 9b be fixed in such a manner that the two overlap each other to some degree in their boundary portions.

Figure 7:
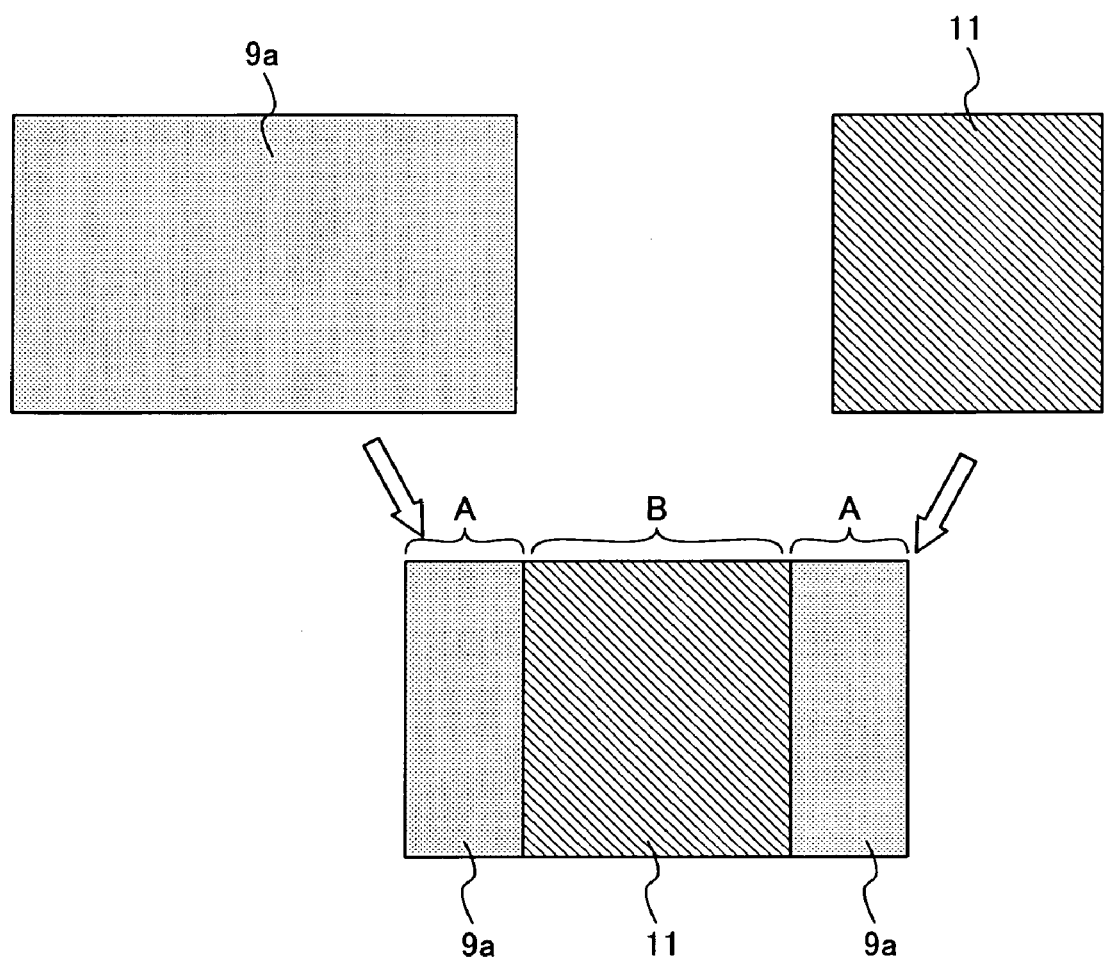
FIG. 7 is a plan view which shows the second modification of the reflecting member according to the first exemplary embodiment of the present invention.

FIG. 7 is a plan view which shows the second modification of the reflecting member according to the first exemplary embodiment of the present invention. In this example of construction, a region of low reflectance is formed by arranging an optical absorber (optical absorbing material) in a reflecting member 9. Concretely, as shown in FIG. 7, the first reflector 9a is arranged in the whole area of the backlight reflection surface (both the region A and the region B), and an absorber 11 having a prescribed absorptivity is arranged in the region B on the top surface of the first reflector 9a. In the case of this construction, if an optical element which is transmitted through the first reflector 9a is ignored, in the middle region B the reflectance decreases by an amount which is absorbed by the absorber 11 and, therefore, the reflectance of the region A can be made higher than the reflectance of the region B. It is preferred that this absorber 11 has an absorptivity equivalent to an amount of decrease in luminance of the lamp 5 in the region A. The material, thickness and manufacturing method of the absorber 11 are not especially limited. The absorber 11 can be formed, for example, from a thin sheet material which is obtained by applying a black paint or pigment to PET, a plate material which is obtained by causing a black paint or pigment to contain in polycarbonate and injection molding this polycarbonate, and the like. Incidentally, contrary to FIG. 7, the absorber 11 may be firmly fixed to the rear surface (the rear frame 10 side) of the first reflector 9a.

Figure 8:
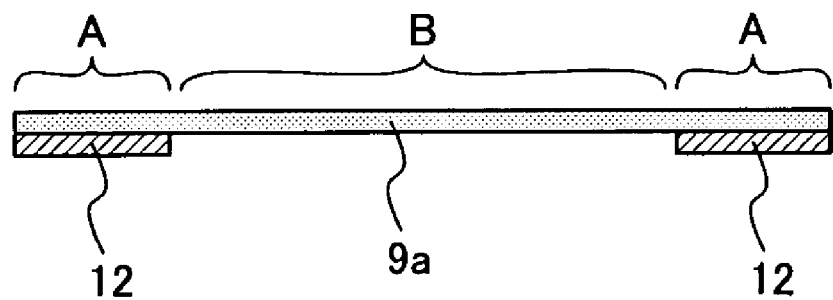
FIG. 8 is a sectional view which shows the third modification of the reflecting member according to the first and second exemplary embodiments of the present invention.

FIG. 8 is a sectional view which shows the third modification of the reflecting member according to the first exemplary embodiment of the present invention. In this example of construction, a region of high reflectance is formed by forming two reflecting films 12 in the first reflector 9a. Concretely, as shown in FIG. 8, the first reflector 9a is arranged in the whole area of the backlight reflection surface (both the region A and the region B), and the reflecting films 12 which irregularly (diffusely) reflect light with a higher reflectance than the rear frame 10 are formed in the region A on at least either of the front surface and the rear surface of the first reflector 9a. In the case of this construction, in the region A, the reflectance is improved by an amount reflected by the reflecting films 12 and, therefore, the reflectance of the region A can be made higher than the reflectance of the region B. It is necessary only that the reflecting films 12 have a higher reflectance than the rear frame 10, and the construction and manufacturing method of the reflecting films 12 are not especially limited. The reflecting films 12 can be formed, for example, by causing fine powders of metal to adhere to the rear surface of the first reflector 9a.

Figure 9:
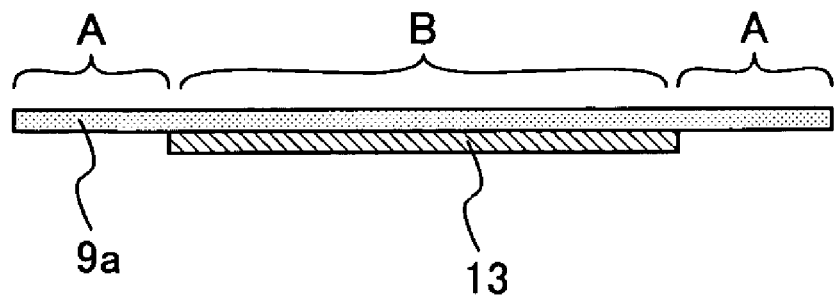
FIG. 9 is a sectional view which shows the fourth modification of the reflecting member according to the first and second exemplary embodiments of the present invention.

FIG. 9 is a sectional view which shows the fourth modification of the reflecting member according to the first exemplary embodiment of the present invention. In this example of construction, a region of low reflectance is formed by forming an absorbing film 13 on the first reflector 9a. Concretely, as shown in FIG. 9, the first reflector 9a is arranged in the whole area of the backlight reflection surface (both the region A and the region B), and the absorbing film 13 is formed in the region B on at least either of the front surface and the rear surface of the first reflector 9a. In the case of this construction, in the longitudinal middle region B, the reflectance decreases by an amount absorbed by the absorbing film 13 and, therefore, the reflectance of the region A can be made higher than the reflectance of the region B. It is preferred that this absorbing film 13 has an absorptivity equivalent to an amount of decrease in luminance of the lamp 5 in the region A, and the construction and manufacturing methods of the absorbing film 13 are not especially limited. The absorbing film 13 can be formed, for example, by printing a dot pattern on the rear surface of the first reflector 9a with a black paint, a black pigment and the like.

Figure 1:
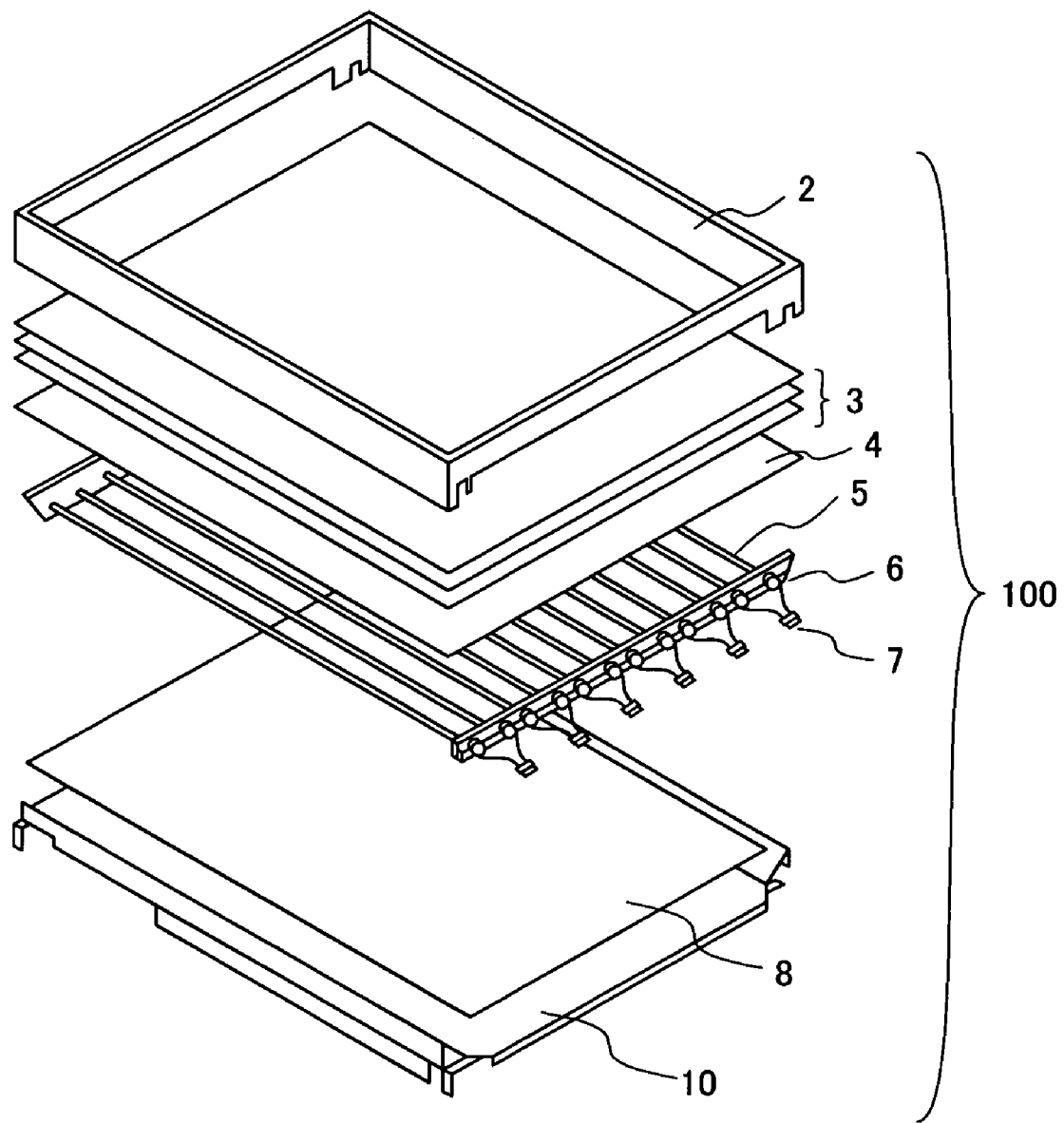
FIG. 1 is a perspective view which shows the construction of a conventional backlight unit in an exploded condition.
Figures 2A, 2B:
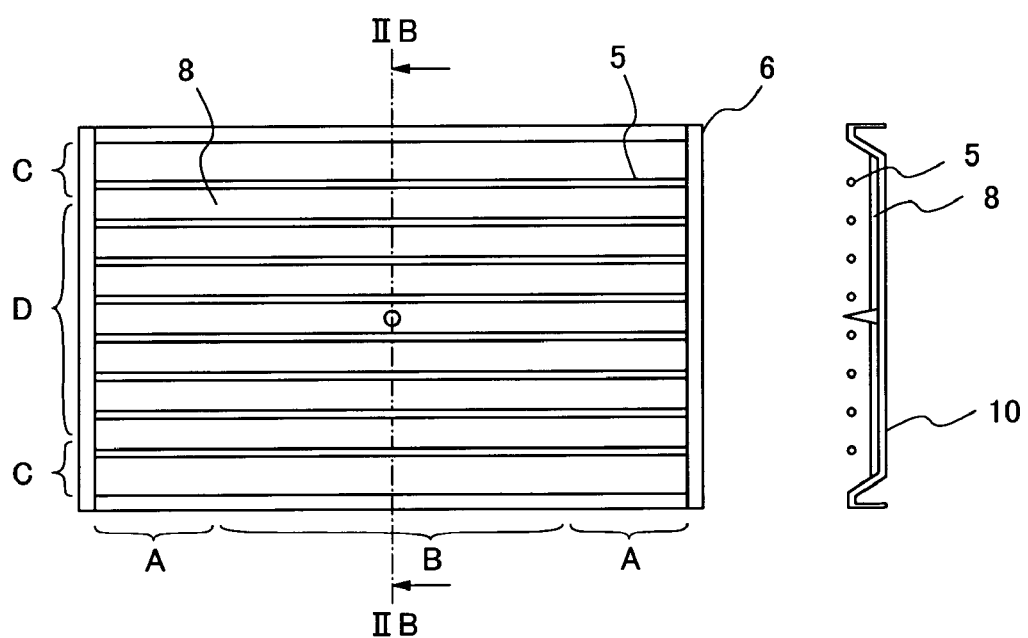
FIG. 2A is a plan view which shows the positional relationship of main members of the conventional backlight unit.
FIG. 2B is a sectional view which schematically shows the section along the line IIB-IIB in FIG. 2A as viewed from the direction of the arrow.

Next, in order to verify the effect of the reflecting member 9 of the present invention, measurement results of luminance are described with reference to FIG. 10 and FIG. 11 by comparing the first exemplary embodiment and a conventional construction. The backlight unit construction shown in FIG. 3 to FIG. 5 was used as the construction of this embodiment of the present invention, and the reflectance of the first reflector 9a and the second reflector 9b of the reflecting member 9 was set at 98.8%. The backlight unit construction shown in FIG. 1 to FIG. 2B was used as a conventional construction to be compared with this construction of the present invention, and the reflectance of the reflector 8 was set at 98.8%. In both constructions, the whole area of the backlight reflection surface (i.e., the first reflector 9a in the construction of the present invention, the reflector 8 in the conventional construction) was divided into nine equal areas in the longitudinal direction of the lamp 5 and the reflecting condition was measured. Incidentally, in the construction of this embodiment of the present invention, the second reflector 9b is arranged in the two divided areas each in both end portions among the nine divided areas. That is, among the nine divided areas, the second reflector 9b occupies two areas from one end, the first reflector 9a occupies five areas in the middle, and the second reflector 9b occupies two areas from the other end.

Figure 10:
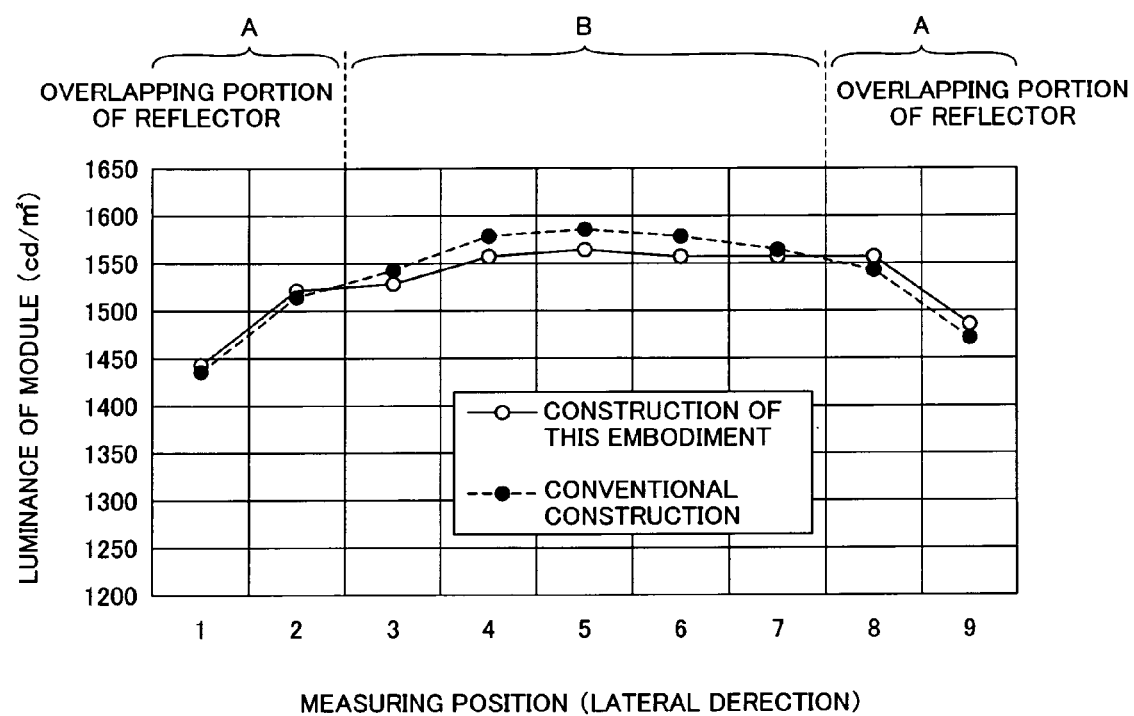
FIG. 10 is a diagram to explain the effect of the reflecting member according to the first exemplary embodiment of the present invention.
Figure 11:
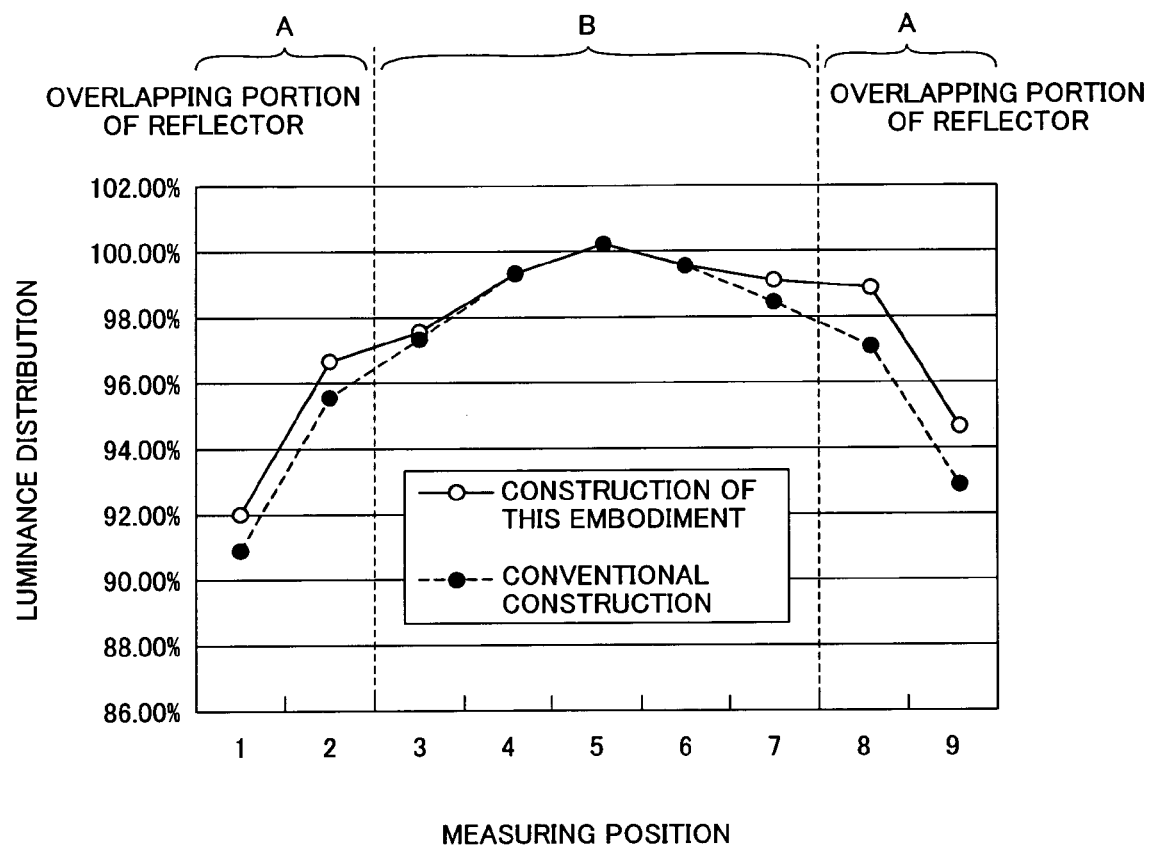
FIG. 11 is a diagram to explain the effect of the reflecting member according to the first exemplary embodiment of the present invention.

In FIG. 10, the abscissa indicates the area dividing position in the longitudinal direction of the lamp 5 (i.e., the lateral direction of the backlight reflection surface) and the ordinate indicates luminance ($cd/m^2$) in each of the divided areas (modules). In FIG. 11, the abscissa indicates the area dividing position in the longitudinal direction of the lamp and the ordinate indicates values obtained by standardizing the luminance in each of the divided areas by a maximum value (luminance distribution). Incidentally, the black circles with the broken line indicate the luminance distribution of the backlight unit of the conventional construction, and the white circles with the solid line indicate the luminance distribution of the backlight unit of the construction of the present invention. From FIG. 10 and FIG. 11, it is apparent that a decrease in luminance in the region near the electrode is suppressed in the construction of the present invention compared to the conventional construction.

In this manner, by relatively raising the reflectance of the reflecting member in the region near the electrode by use of the various constructions and methods described above, it is possible to suppress a decrease in luminance in the region near the electrode ascribable to the characteristics of the lamp while suppressing an increase in the size and thickness of the backlight unit and a rise in the cost thereof and it is possible to improve the uniformity of luminance in the backlight reflection surface.

Figures 12A, 12B:
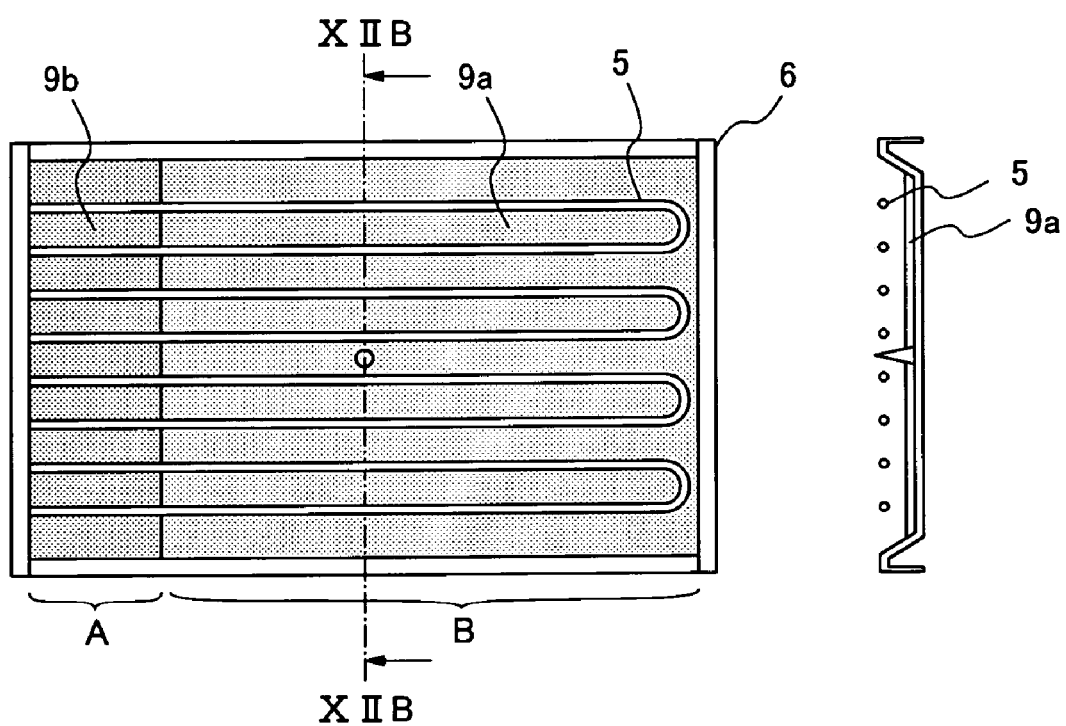
FIG. 12A is a plan view which shows another modification of the backlight unit according to the first exemplary embodiment of the present invention.
FIG. 12B is a sectional view which schematically shows the section along the line XIIB-XIIB in FIG. 12A as viewed from the direction of the arrow.
Figure 13A:
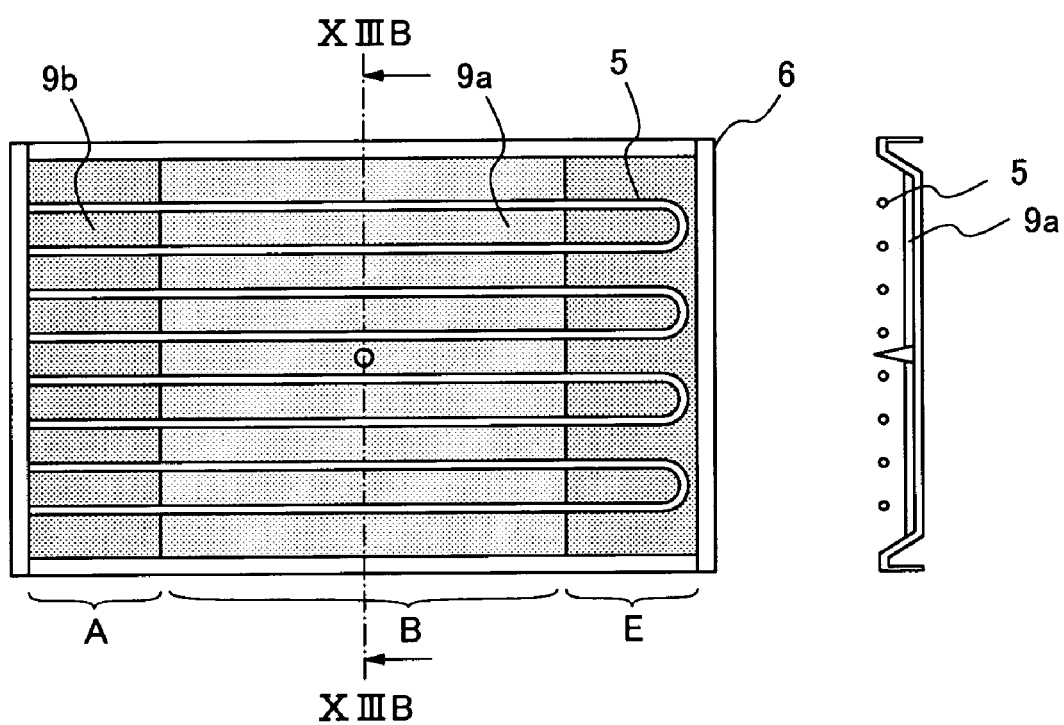
FIG. 13A is a plan view which shows still another modification of the backlight unit according to the first exemplary embodiment of the present invention.
Figure 13B:
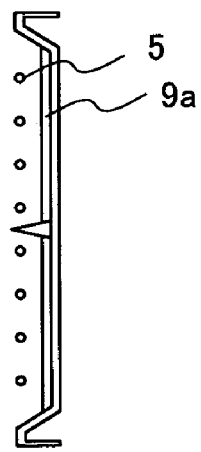
FIG. 13B is a sectional view which schematically shows the section along the line XIIIB-XIIIB in FIG. 13A as viewed from the direction of the arrow.

Incidentally, although the linear lamp 5 is shown in the above-described exemplary embodiment, a similar effect can be obtained also in a case where as shown in FIG. 12A and FIG. 12B, a U-shaped lamp is used. In this case, the electrode of the lamp 5 is arranged only in one end portion of the lamp 5. Therefore, the first reflector 9a, the second reflector 9b, the absorber 11, the reflecting film 12, the absorbing film 13 and the like are arranged in such a manner that the reflectance of the electrode near region A on the side where the electrode is arranged (on the left side in FIG. 12A) becomes relatively higher than the reflectance of the longitudinal middle region B. If a decrease in luminance occurs in a region E near the U-shaped bent portion of the lamp 5, as shown in FIG. 13A and FIG. 13B, the first reflector 9a, the second reflector 9b, the absorber 11, the reflecting film 12, the absorbing film 13 and the like may be arranged in such a manner that the reflectance of the region A and the region E becomes relatively higher than the reflectance of the region B.

Figures 14A, 14B:
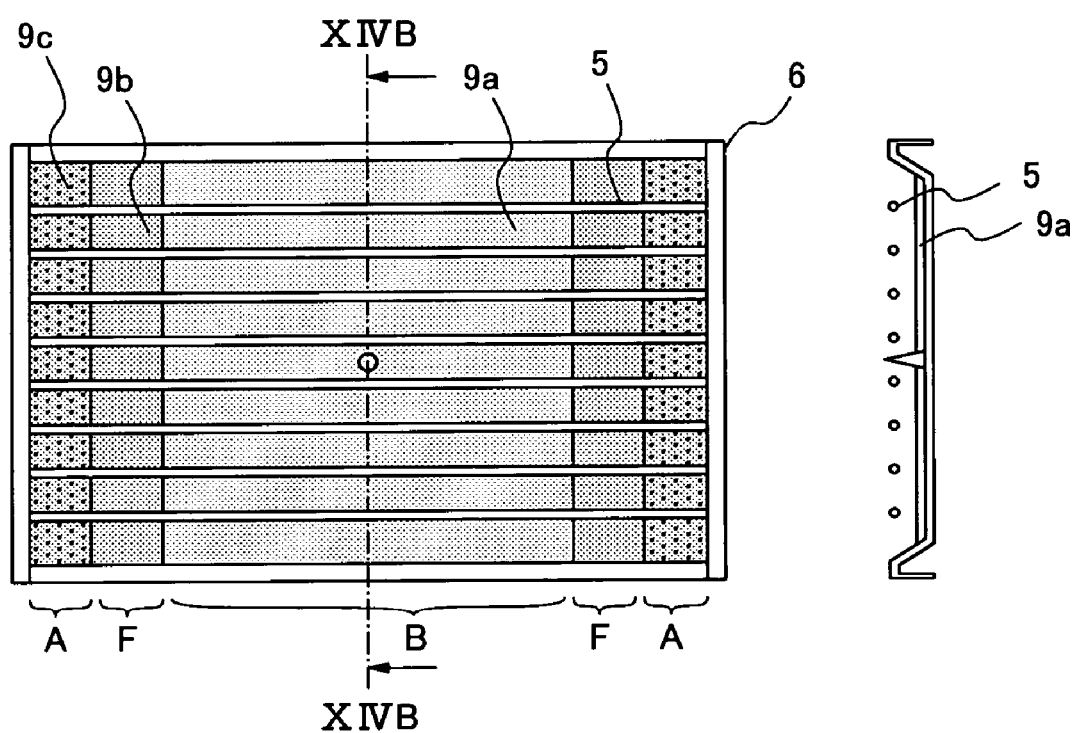
FIG. 14A is a plan view which shows a further modification of the backlight unit according to the first exemplary embodiment of the present invention.
FIG. 14B is a sectional view which schematically shows the section along the line XIVB-XIVB in FIG. 14A as viewed from the direction of the arrow.

Although the backlight reflection surface is divided into two kinds of regions in the above-described exemplary embodiment, it is also possible to divide the backlight reflection surface into three or more kinds of regions. For example, as shown in FIG. 14A and FIG. 14B, an intermediate region F may be provided between the region A and the region B. In this case, for example, the first reflector 9a is provided in the whole area of the backlight reflection surface (all the region A, the region F and the region B), the second reflector 9b is further provided in an overlapping manner in the region A and the region F, and a third reflector 9c is provided in an overlapping manner only in the region A. In this manner, a similar effect can be realized by using the various constructions described above. In this case, it is necessary only that adjustment be made so that the reflectance of the completed reflecting member 9 meets the requirement: the reflectance of the region A>the reflectance of the region F>the reflectance of the region B.

Figure 15A:
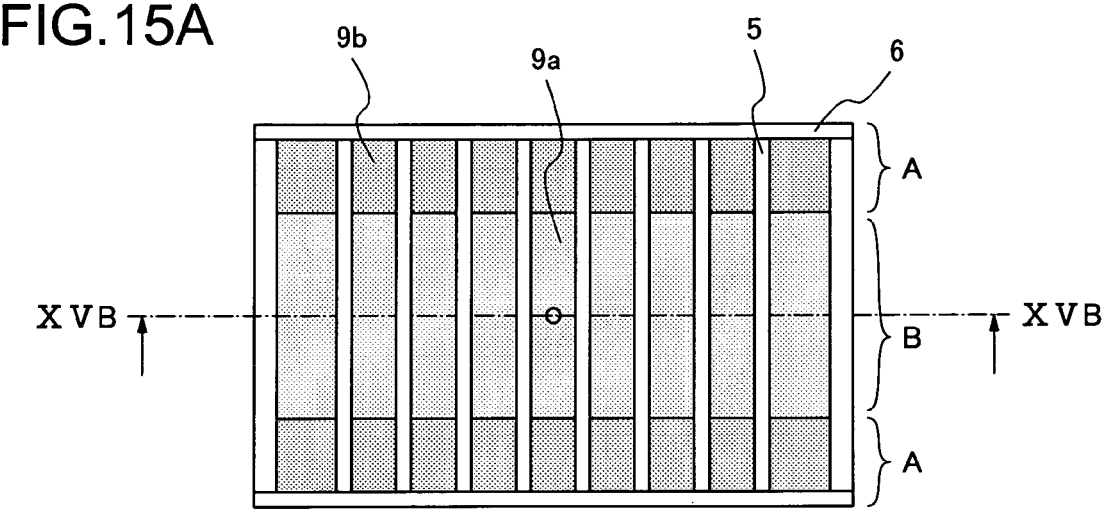
FIG. 15A is a plan view which shows an additional modification of the backlight unit according to the first exemplary embodiment of the present invention.
Figure 15B:
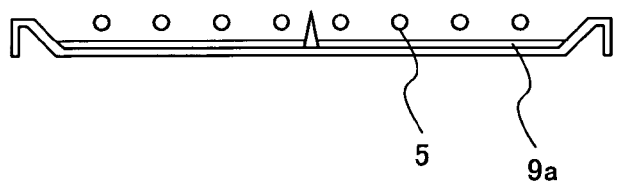
FIG. 15B is a sectional view which schematically shows the section along the line XVB-XVB in FIG. 15A as viewed from the direction of the arrow.

Although the arrangement is performed in the above-described exemplary embodiment so that the longitudinal direction of the backlight unit coincides with the longitudinal direction of the lamp 5, this may be changed. For example, as shown in FIG. 15A and FIG. 15B, the linear lamp 5 (or the U-shaped lamp) may be arranged to as to be orthogonal to the longitudinal direction of the backlight unit. In this case, the positions of the lamp support 6 and the lamp connector 7 are also changed. The electrode near region A and the longitudinal middle region B are also changed to match the longitudinal direction of the lamp 5.

Second Exemplary Embodiment

Figure 16:
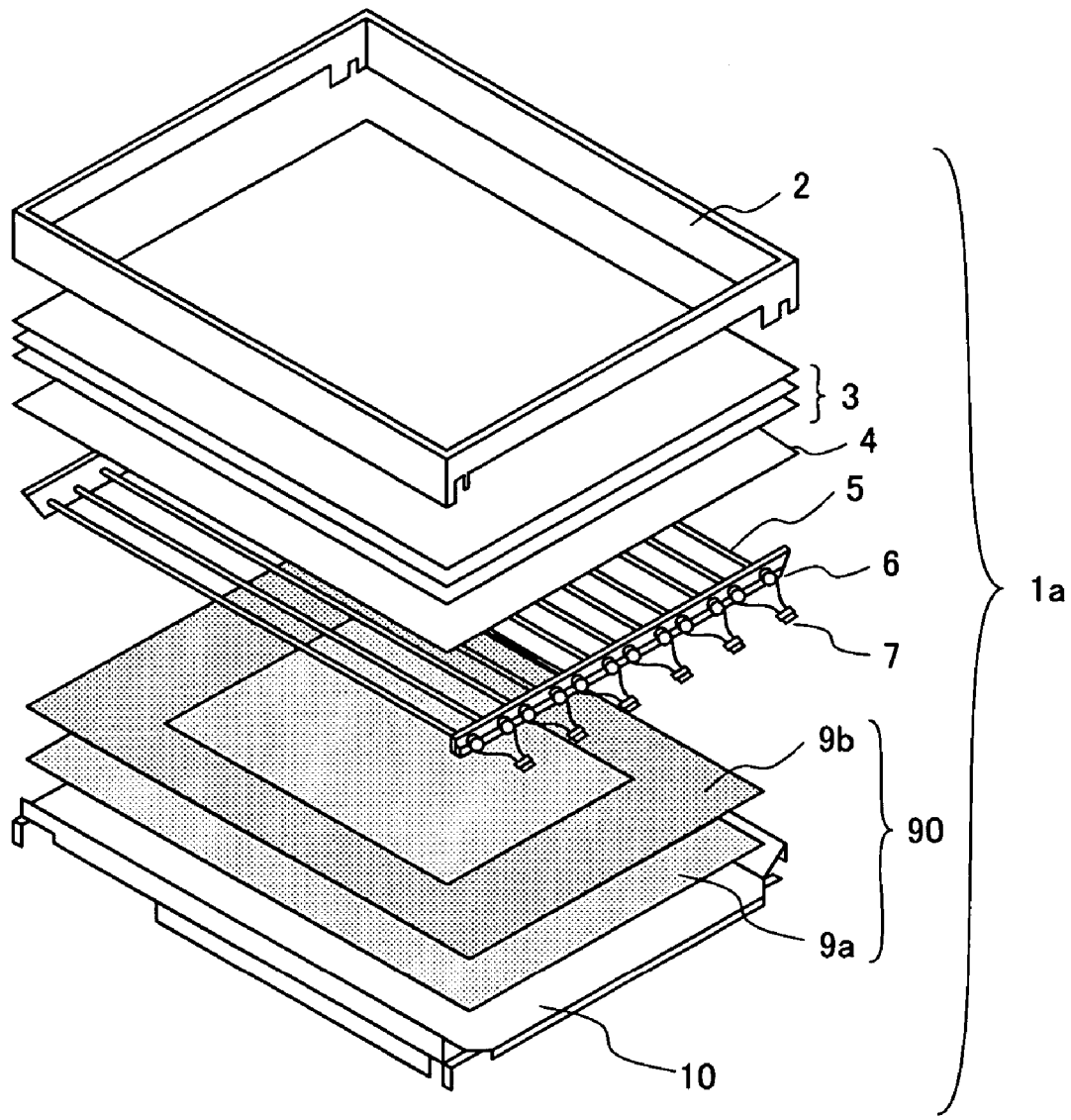
FIG. 16 is a perspective view which shows the construction of a backlight unit according to the second exemplary embodiment of the present invention in an exploded condition.
Figures 17A, 17B:
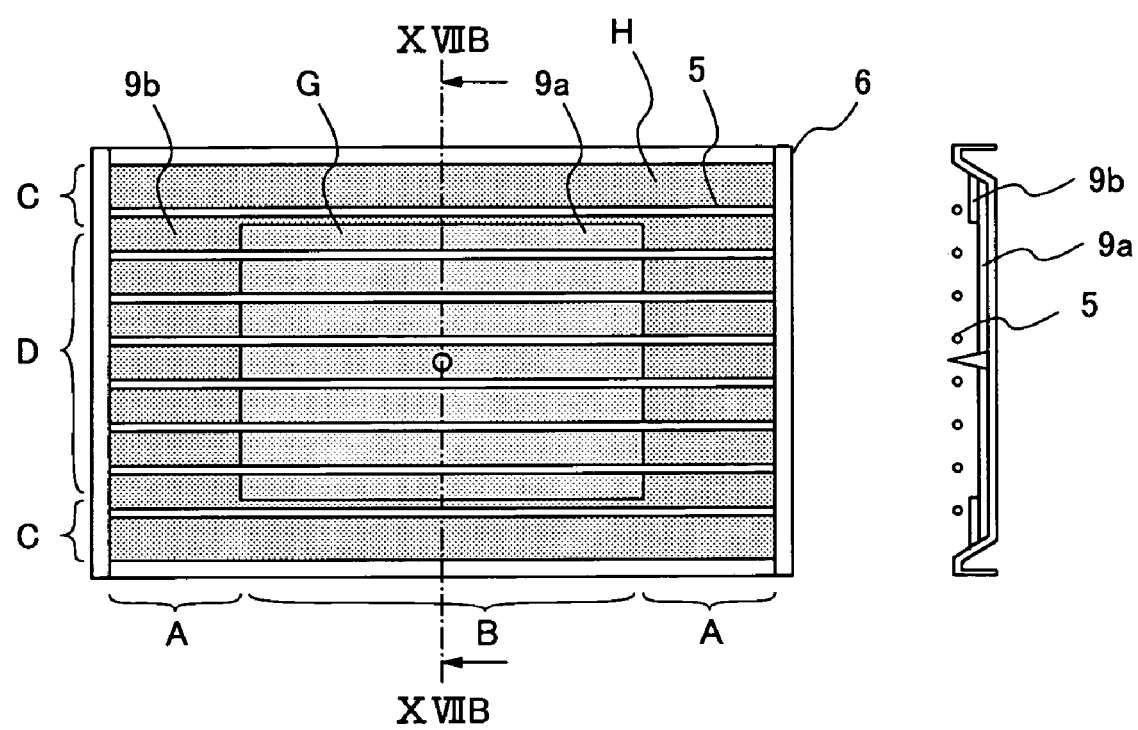
FIG. 17A is a plan view which shows the positional relationship of main members of the backlight unit according to the second exemplary embodiment of the present invention.
FIG. 17B is a sectional view which schematically shows the section along the line XVIIB-XVIIB in FIG. 17A as viewed from the direction of the arrow.
Figure 18:
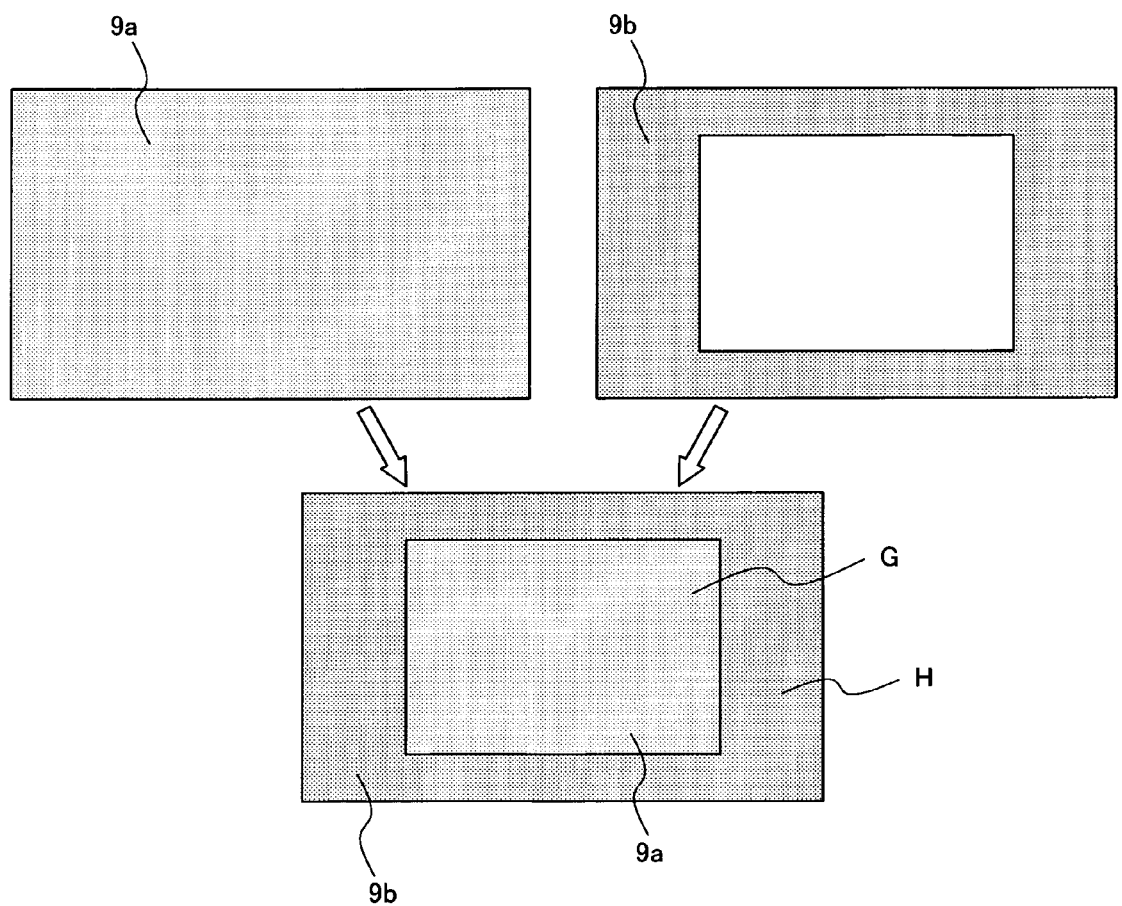
FIG. 18 is a plan view which shows the construction of a reflecting member according to the second exemplary embodiment of the present invention.

Next, the second exemplary embodiment of the present invention will be described. FIG. 16 is a perspective view which shows the construction of a backlight unit according to the second exemplary embodiment of the present invention in an exploded condition. FIG. 17A is a plan view which shows the positional relationship of main members of the backlight unit according to the second exemplary embodiment of the present invention. FIG. 17B is a sectional view which schematically shows the section along the line XVIIB-XVIIB in FIG. 17A as viewed from the direction of the arrow. FIG. 18 is a plan view which shows the construction of a reflecting member according to the second exemplary embodiment of the present invention.

As shown in FIG. 16, a backlight unit 1a in this embodiment is constituted by a lamp 5, a lamp support 6, a lamp connector 7, a reflecting member 90, a diffuser 4, an optical sheet 3, a rear frame 10 and a center frame 2. The second exemplary embodiment differs from the first exemplary embodiment in that the reflecting member 9 (in the first exemplary embodiment) is replaced with the reflecting member 90 (in the second exemplary embodiment). Because all the other component parts are the same, like reference numerals refer to these parts and their detailed descriptions will not be repeated.

As in the first exemplary embodiment, the reflecting member 90 is provided with a first reflector 9a and a second reflector 9b. However, the region covered by the second reflector 9b differs from that of the first exemplary embodiment and this is a feature of this embodiment. That is, in this second exemplary embodiment, the backlight reflection surface of the reflecting member 90 is divided into regions not only in the longitudinal direction of the lamp 5, but also in the arrangement direction of plural lamps in order to give these regions different reflectances.

A detailed description will be given with reference to FIG. 17A and FIG. 17B. The backlight reflection surface of the reflecting member 90 has, in the longitudinal direction, an electrode near region A which is opposed to the electrodes of the lamp 5, and a middle region B in the longitudinal direction which is nearer to a middle area than the region A. Furthermore, the backlight reflection surface of the reflecting member 90 has, in the lamp arrangement direction, a region C opposed to an area near the lamp 5 arranged at end portions (an end lamp near region C) and a region D which is nearer to a middle area than the region C (an arrangement direction middle region D). Incidentally, the electrode near region A, the longitudinal middle region B, the end lamp near region C and the arrangement direction middle region D in FIG. 17A are exemplary ones. It is necessary only that the region A and the region C be constructed so as to contain a region where luminance of the lamp 5 decreases. That is, the shape and boundary of each of the regions can be appropriately changed according to the characteristics of the lamp 5 and the arrangement of the lamp 5.

In the backlight reflection surface, a region where the longitudinal middle region B and the arrangement direction middle region D overlap each other is called a center region G. Furthermore, other regions covered by the electrode near region A or the end lamp near region C are called a peripheral region H. In the example of FIG. 17A, the peripheral region H has a frame shape which surrounds the center region G.

In the above-described first exemplary embodiment, a construction which dissolves the problem of a decrease in luminance near the electrode due to the characteristics of the lamp 5 was shown. However, as described in the related art, in a case where the distance from the lamp 5 arranged in an end portion in the lamp arrangement direction which is orthogonal to the longitudinal direction of the lamp to the inclined surface of the reflecting member is large, a difference in luminance distribution in the arrangement of the lamp 5 occurs and uniformly illumination of the display panel is impossible. In this embodiment, therefore, the reflectance of the peripheral region H of the reflecting member 90 is made higher than the reflectance of the center region G in order to suppress not only the decrease in luminance caused by the characteristics of the lamp 5, but also the decrease in luminance caused by the arrangement of the lamp 5.

Figure 19:
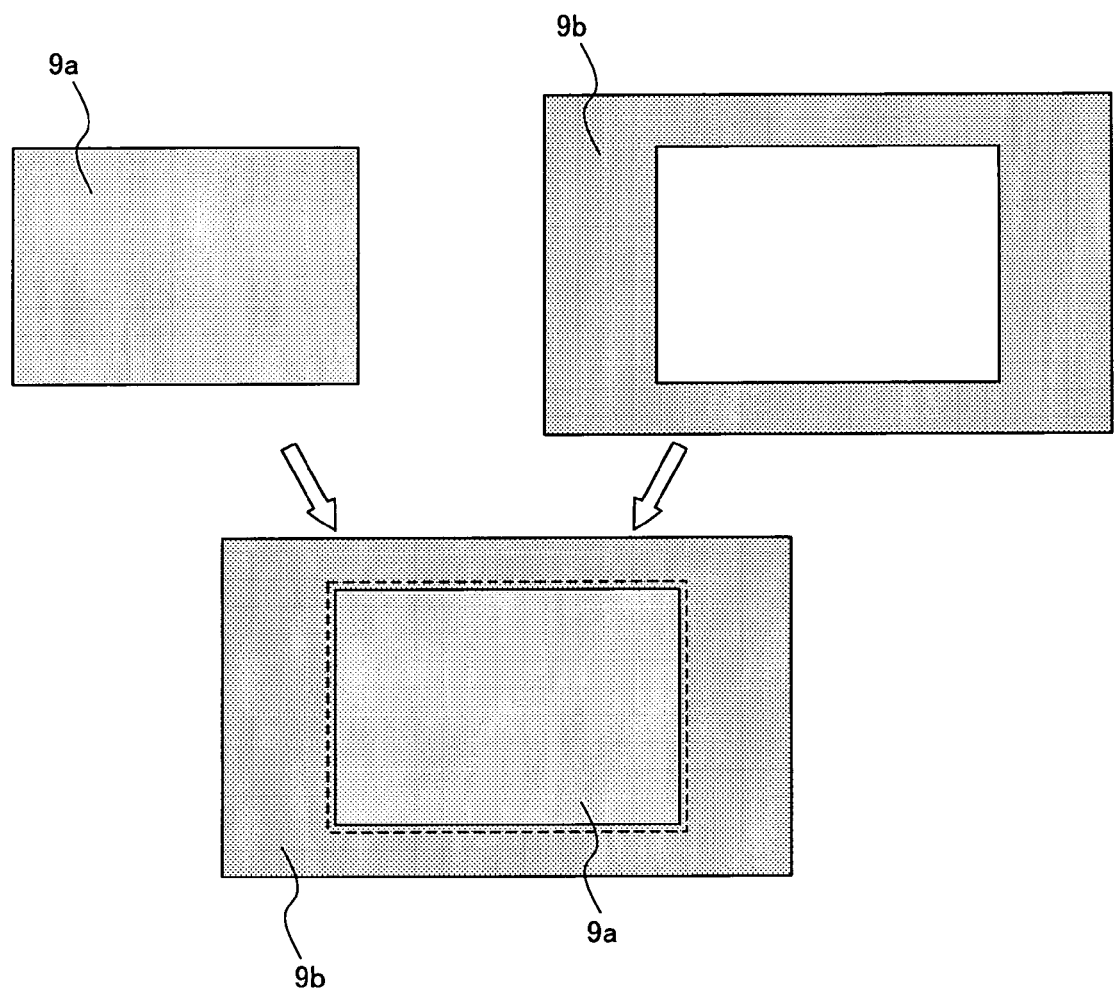
FIG. 19 is a plan view which shows the first modification of the reflecting member according to the second exemplary embodiment of the present invention.
Figure 20:
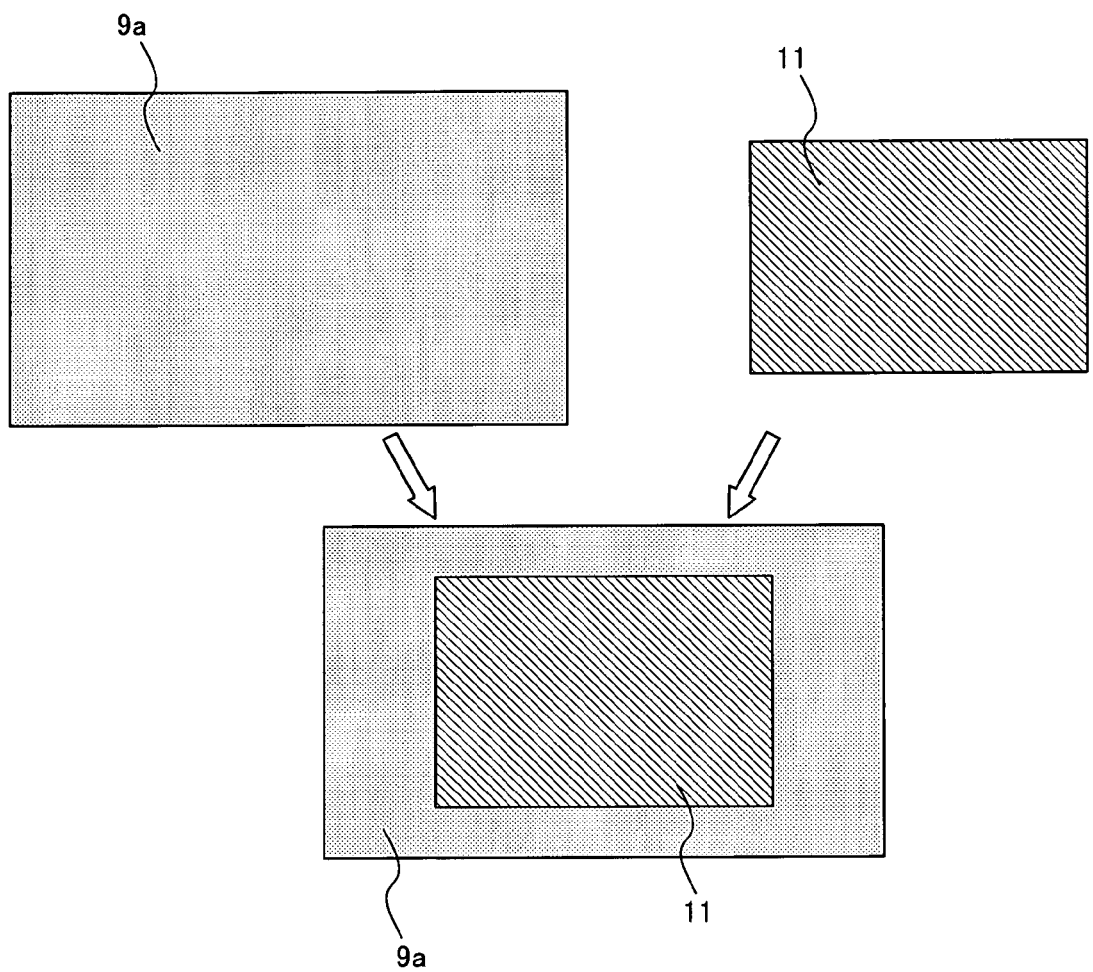
FIG. 20 is a plan view which shows the second modification of the reflecting member according to the second exemplary embodiment of the present invention.

Hereinafter, the construction of the reflecting member 90 and how to realize the reflecting member 90 will be described with reference to FIG. 18 to FIG. 24B. Incidentally, in the same way as in the first exemplary embodiment, FIG. 18 to FIG. 20 show only the construction of the reflecting member 90 on the inner bottom surface of the rear frame 10. When inclined surfaces are provided on the side walls of the rear frame 10, the size of the reflecting member 90 may be changed as required.

An example of the construction of the reflecting member 90 which will be described first is the construction shown in FIG. 16 to FIG. 18. That is, a region having a low reflectance is formed in a center area by superposing two kinds of reflectors (reflecting materials). Concretely, as shown in FIG. 18, the first reflector 9a is disposed in the whole area of the backlight reflection surface (the center region G and the peripheral region H), and the frame-shaped second reflector 9b is disposed only in the peripheral region H of the top surface (the lamp 5 side) of this first reflector 9a. In the case of this construction, the reflectance of the first reflector 9a and the reflectance of the second reflector 9b may be the same or different from each other. The reflectance can be changed by changing the amount of a white paint or a white pigment which is applied to PET or contained in polycarbonate. Incidentally, contrary to FIG. 18, the second reflector 9b may be firmly fixed to the rear surface (the rear frame 10 side) of the first reflector 9a.

Next, modifications of the construction of the reflecting member 90 will be described. In the first modification shown in FIG. 19, the reflectance is varied by arranging two reflectors having different reflectances. Concretely, as shown in FIG. 19, the first reflector 9*a* having a relatively low reflectance is arranged in the center region G of the backlight reflection surface and the frame-shaped second reflector 9*b* having a relatively high reflectance is arranged in the peripheral region H. In this construction, in order to prevent the change in luminance ascribed to the deformation of the reflectors by heat and the change in the reflection characteristics, which were described in the first exemplary embodiment, it is preferred that the first reflector 9*a* and the second reflector 9*b* be fixed in such a manner that the two overlap each other to some degree in their boundary portions.

Next, in the second modification of the reflecting member 90 shown in FIG. 20, a region of low reflectance is formed by arranging an absorber. Concretely, as shown, in FIG. 20, the first reflector 9*a* is arranged in the whole area of the backlight reflection surface, and the absorber 11 having a prescribed absorptivity is arranged in the center region G on the top surface of this first reflector 9*a*. Contrary to FIG. 20, the absorber 11 can be arranged on the rear surface of the first reflector 9*a*. For example, this absorber 11 can be formed from a thin sheet material which is obtained by applying a black paint or pigment to PET, a plate material which is obtained by causing a black paint or pigment to contain in polycarbonate and injection molding this polycarbonate, and the like.

In the third modification of the reflecting member 90, a region of high reflectance is formed by forming a reflecting film 12 on the first reflector 9*a*. Concretely, the first reflector 9*a* is arranged in the whole area of the backlight reflection surface, and the reflecting film 12 which irregularly or diffusely reflects light with, a higher reflectance than the rear frame 10 is formed in the peripheral region H on at least either of the front surface and the rear surface of the first reflector 9*a*. In this case, the sectional construction in the middle area is the same as in FIG. 8 shown in the first exemplary embodiment. The reflecting film 12 can be formed, for example, by causing fine powders of metal to adhere to the front surface or the rear surface of the first reflector 9*a*.

Next, in the fourth modification of the reflecting member 90, a region of low reflectance is formed by forming an absorbing film 13 on the first reflector 9*a*. Concretely, the first reflector 9*a* is arranged in the whole area of the backlight reflection surface, and the absorbing film 13 is formed in the center region G on at least either of the front surface and the rear surface of the first reflector 9*a*. In the case of this construction, the sectional construction in the middle area is the same as in FIG. 9 shown in the first exemplary embodiment. This absorbing film 13 can be formed, for example, by printing a dot pattern on the front surface or the rear surface of the first reflector 9*a* with a black paint, a black pigment and the like.

In this manner, the reflectance of the region near the electrode and the region near the end lamp (i.e., the peripheral region H) is relatively raised by use of the various constructions and methods described above. As a result of this, it is possible to suppress both the decrease in luminance caused by the characteristics of the lamp and the decrease in luminance caused by the arrangement of the lamp while suppressing an increase in the size and thickness of the backlight unit and arise in the cost thereof and it is possible to improve the uniformity of luminance within the surface illuminated by the backlight unit. Furthermore, because in this embodiment the lamp pitch can be made narrow, it is possible to, gather the lamps 5 in the middle of the surface illuminated by the backlight unit, thereby making it possible to raise the degree of freedom in design of the backlight unit.

Figures 21A, 21B:
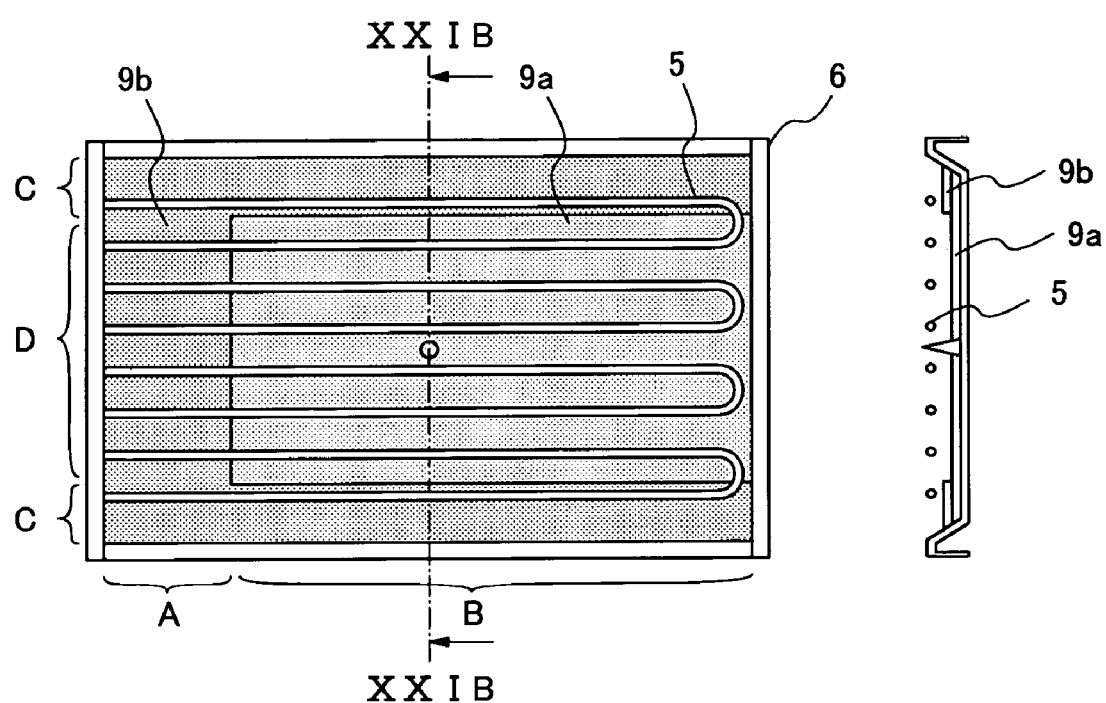
FIG. 21A is a plan view which shows another modification of the backlight unit according to the second exemplary embodiment of the present invention.
FIG. 21B is a sectional view which schematically shows the section along the line XXIB-XXIB in FIG. 21A as viewed from the direction of the arrow.
Figure 22A:
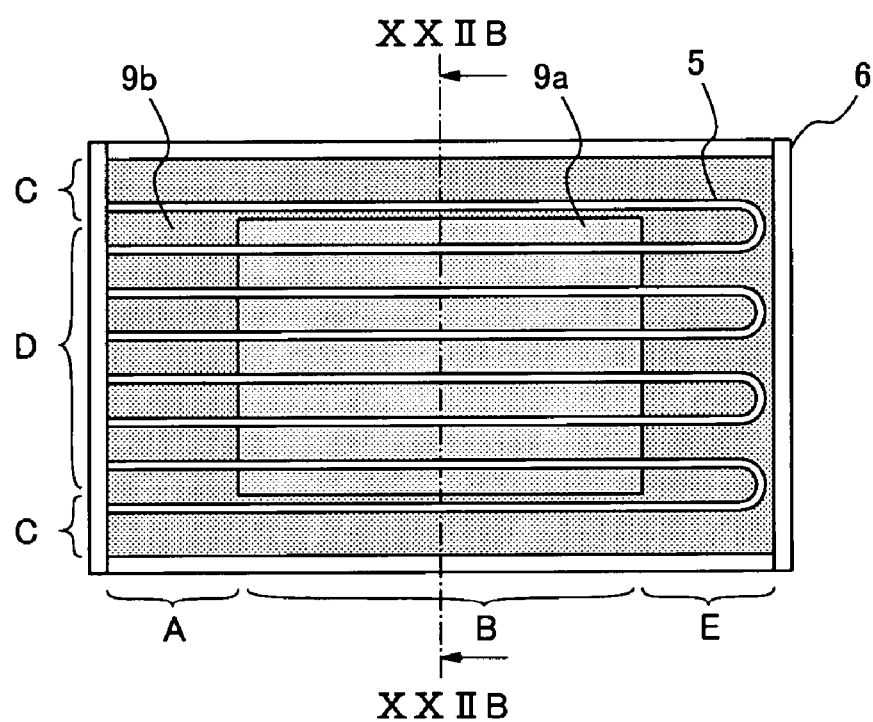
FIG. 22A is a plan view which shows still another modification of the backlight unit according to the second exemplary embodiment of the present invention.
Figure 22B:
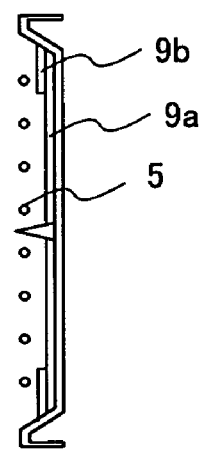
FIG. 22B is a sectional view which schematically shows the section along the line XXIIB-XXIIB in FIG. 22A as viewed from the direction of the arrow.

Incidentally, although the linear lamp 5 is shown in the above descriptions, a similar effect can be obtained also in a case where in the same manner as in the first exemplary embodiment a U-shaped lamp is used as shown in FIG. 21A and FIG. 21B. In the case of this construction, the first reflector 9*a*, the second reflector 9*b*, the absorber 11, the reflecting film 12, the absorbing film 13 and the like are arranged in such a manner that the reflectance of the U-shaped region which covers the electrode near region A on one side where the lamp electrode is arranged (on the left side in FIG. 12A) and the end lamp near region C becomes relatively higher than the reflectance of the center region H (i.e., region where the region B and the region D overlap each ether). If a decrease in luminance in a region E near the U-shaped bent portion of the lamp 5 occurs, as shown in FIG. 22A and FIG. 22B, the first reflector 9*a*, the second reflector 9*b*, the absorber 11, the reflecting film 12, the absorbing film 13 and the like may be arranged in such a manner that the reflectance of a region covered by any of the region A, the region E and the region C becomes relatively higher than the reflectance of the center region G.

Figures 23A, 23B:
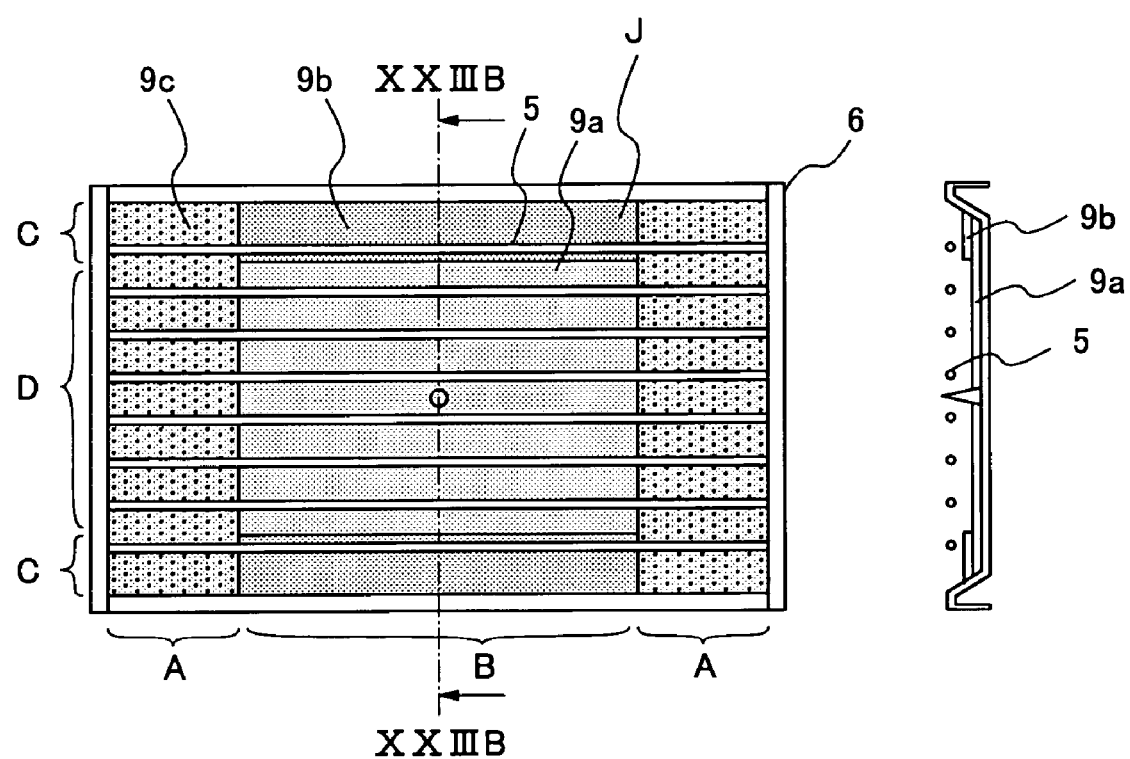
FIG. 23A is a plan view which shows a further modification of the backlight unit according to the second exemplary embodiment of the present invention.
FIG. 23B is a sectional view which schematically shows the section along the line XXIIIB-XXIIIB in FIG. 23A as viewed from the direction of the arrow.

Although in the above descriptions the backlight reflection surface is divided into the two regions of the center region G and the peripheral region H, it is also possible to divide the backlight reflection surface into three or more regions. For example, as shown in FIG. 23A and FIG. 23B, it is also possible to divide the backlight reflection surface into the center region G, the electrode near region A and an other region J (a region where the end lamp near region C and the longitudinal middle region B overlap each other). In this case, for example, the first reflector 9*a* is first provided in the whole area of the backlight reflection surface, the frame-shaped second reflector 9*b* is next provided in the peripheral region H, and a third reflector 9*c* is provided only in the electrode near region A, whereby the luminance can be adjusted.

In the above descriptions, the lamp 5 is arranged so that the longitudinal direction of the backlight unit coincides with the longitudinal direction of the lamp 5. However, in the same manner as shown in FIG. 15A and FIG. 15B of the first exemplary embodiment, the linear lamp 5 (or the U-shaped lamp) may be arranged to as to be orthogonal to the longitudinal direction of the backlight unit.

Figure 24A:
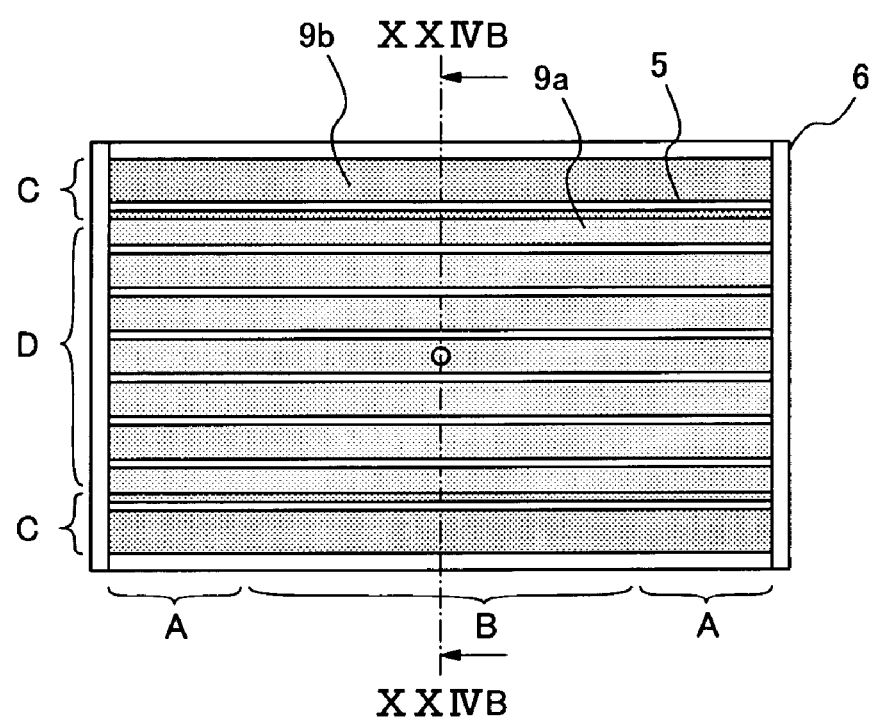
FIG. 24A is a plan view which shows an additional modification of the backlight unit according to the second exemplary embodiment of the present invention.
Figure 24B:
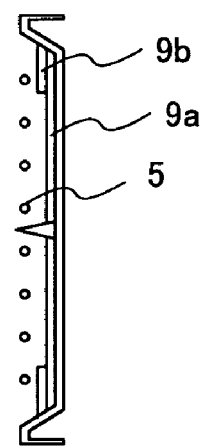
FIG. 24B is a sectional view which schematically shows the section along the line XXIVB-XXIVB in FIG. 24A as viewed from the direction of the arrow.

In the above descriptions, the reflectance of the region A and the region C is raised in order to suppress both the decrease in luminance in the region A near the electrode of the lamp 5 and the decrease in luminance in the region C near the end lamp of the lamp 5. However, in a case where the characteristics of the lamp 5 are good and the decrease in luminance near the electrode does not pose a problem, it is also possible to make only the reflectance of the region C near the end lamp relatively higher than the reflectance of the middle region D in the arrangement direction, as shown in FIG. 24A and FIG. 24B.

Although in each of the above-described embodiments, the shape of the first reflector 9*a*, the second reflector 9*b*, the third reflector 9*c*, the absorber 11, the reflecting film 12 and the absorbing film 13 is rectangular. However, the present invention is not limited to this. In consideration of the distribution of luminance, the shape of these members can be appropriately changed and, for example, it is possible to adopt arbitrary shapes, such as a circle, an oval, a polygon and shapes having rounded corners.

The present invention which has been described above can be applied to a backlight unit in general, which illuminates a display device, such as a liquid crystal display panel of an arbitrary driving method, from directly below.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

This application is based on Japanese Patent Application No. JP 2005-267866 filed on Sep. 15, 2005, and including a specification, claims, drawings and summary.

What is claimed is:

1. A backlight unit which illuminates a display panel from a rear surface thereof, comprising at least:
    tubular lamps arranged in parallel to the display panel; and
    a reflecting member which reflects light from the lamps toward the display panel,
    wherein the reflecting member is divided into a first region opposed to an area near an electrode provided in an end portion of the lamp and a second region nearer to a middle area than the first region,
    wherein the first region has a higher reflectance than the second region, and
    wherein the first region comprises a continuous portion that extends from one side of the display panel to an other side of the display panel and being perpendicular to a direction of extension of the lamp, said continuous portion covering an entirety of end portions of the tubular lamps adjacent to an edge of the rear surface.

2. The backlight unit according to claim 1, wherein the reflecting member includes:
    a first reflector which is disposed in the first region and the second region; and
    a second reflector disposed in the first region.

3. The backlight unit according to claim 1, wherein the reflecting member includes:
    a first reflector disposed in the second region; and
    a second reflector which is disposed in the first region and has a higher reflectance than the first reflector.

4. The backlight unit according to claim 1, wherein the reflecting member includes:
    a reflector disposed in the first region and the second region; and
    an absorber which is disposed in the second region and has a prescribed absorptivity.

5. The backlight unit according to claim 1, wherein the reflecting member includes:
    a reflector disposed in the first region and the second region; and
    a reflecting film having a prescribed reflectance which is formed in the first region of the reflector.

6. The backlight unit according to claim 1, wherein the reflecting member includes:
    a reflector disposed in the first region and the second region; and
    an absorbing film having a prescribed absorptivity which is formed in the second region of the reflector.

7. The backlight unit according to claim 1, wherein each of the lamps comprises a U-shaped lamp.

8. The backlight unit according to claim 1, wherein the reflecting member further comprises a third region between the first region and the second region,
    the third region having a reflectance which is lower than the reflectance of the first region and higher than the reflectance of the second region.

9. The backlight unit according to claim 1, wherein the first region further includes a region opposed to an area near a lamp arranged in an end portion with respect to an arrangement direction of the lamps.

10. The backlight unit according to claim 9, wherein the first region has a shape which surrounds the second region.

11. The backlight unit according to claim 9, wherein the reflecting member includes:
    a first reflector disposed in the second region; and
    a second reflector which is disposed in the first region and has a higher reflectance than the first reflector.

12. The backlight unit according to claim 9, wherein the reflecting member includes:
    a reflector disposed in the first region and the second region; and
    an absorber which is disposed in the second region and has a prescribed absorptivity.

13. The backlight unit according to claim 9, wherein the reflecting member includes:
    a reflector disposed in the first region and the second region; and
    a reflecting film having a prescribed reflectance which is formed in the first region of the reflector.

14. The backlight unit according to claim 9, wherein the reflecting member includes:
    a reflector disposed in the first region and the second region; and
    an absorbing film having a prescribed absorptivity which is formed in the second region of the reflector.

15. The backlight unit according to claim 9, wherein each of the lamps comprises a U-shaped lamp.

16. The backlight unit according to claim 15, wherein a region opposed to an area near a bent portion of the U-shaped lamp is the same as the first region.

17. The backlight unit according to claim 1, wherein the first region comprises the area near the electrode rather than an area which extends in a direction of said parallel lamps, and
    wherein the reflecting member comprises a flat sheet.

18. The backlight unit according to claim 1, wherein said reflecting member comprises a single-piece sheet to control an entirety of luminance distribution of all of the tubular lamps.

19. A backlight unit which illuminates a display panel from a rear surface thereof, comprising at least:
    tubular lamps arranged in parallel to the display panel; and
    a reflecting member which reflects light from the lamps toward the display panel,
    wherein the reflecting member is divided into a first region opposed to an area near an electrode provided in an end portion of a lamp and a second region nearer to a middle area than the first region,
    wherein the first region has a higher reflectance than the second region,
    wherein the first region further includes a region opposed to an area near a lamp arranged in an end portion with respect to an arrangement direction of the lamps, and
    wherein the reflecting member includes:
        a first reflector disposed in the first region and the second region; and
        a second reflector disposed in the first region.

20. A backlight unit which illuminates a display panel from a rear surface thereof, comprising at least:
- tubular lamps arranged in parallel to the display panel; and
- a reflecting member which reflects light from the lamps toward the display panel,
- wherein the reflecting member is divided into a first region opposed to an area near an electrode provided in an end portion of a lamp and a second region nearer to a middle area than the first region,
- wherein the first region has a higher reflectance than the second region,
- wherein the second region is further divided, with respect to an arrangement direction of the lamps, into an end lamp region which is opposed to an area near a lamp arranged in an end portion and a middle region which is nearer to a middle area than the end lamp region, and
- wherein the end lamp region has a higher reflectance than the middle region.

21. A backlight unit which illuminates a display panel from a rear surface thereof, comprising at least:
- tubular lamps arranged in parallel to the display panel; and
- a reflecting member which reflects light from the lamps toward the display panel,
- wherein the reflecting member is divided, with respect to the arrangement direction of the lamps, into at least an end lamp region which is opposed to an area near a lamp arranged in an end portion and a middle region which is nearer to a middle area than the end lamp region,
- wherein the end lamp region has a higher reflectance than the middle region, and
- wherein the first region comprises a continuous portion that extends from one side of the display panel to an other side of the display panel and being perpendicular to a direction of extension of the lamp, said continuous portion covering an entirety of end portions of the tubular lamps adjacent to an edge of the rear surface.

22. The backlight unit according to claim 21, wherein said reflecting member comprises a single-piece sheet to control an entirety of luminance distribution of all of the tubular lamps.

* * * * *